(12) United States Patent
Ishii

(10) Patent No.: US 6,404,414 B2
(45) Date of Patent: *Jun. 11, 2002

(54) LIQUID CRYSTAL DEVICE, ELECTRO-OPTICAL DEVICE, AND PROJECTION DISPLAY DEVICE EMPLOYING THE SAME

(75) Inventor: Kenya Ishii, Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,446
(22) PCT Filed: Mar. 18, 1998
(86) PCT No.: PCT/JP98/01175
§ 371 (c)(1),
(2), (4) Date: Nov. 27, 1998
(87) PCT Pub. No.: WO98/43130
PCT Pub. Date: Oct. 1, 1998

(30) Foreign Application Priority Data

Mar. 26, 1997 (JP) .............................................. 9-074204

(51) Int. Cl.[7] .................................................. G09G 3/00
(52) U.S. Cl. .............................. 345/90; 345/58; 345/98; 345/100
(58) Field of Search ............................. 345/32, 58, 90, 345/98, 100

(56) References Cited

U.S. PATENT DOCUMENTS

| | | | | |
|---|---|---|---|---|
| 4,682,048 A | * | 7/1987 | Ishimoto ....................... | 327/172 |
| 4,845,482 A | * | 7/1989 | Howard et al. ................ | 345/58 |
| 5,300,942 A | * | 4/1994 | Dolgoff ........................ | 345/32 |
| 5,627,560 A | * | 5/1997 | Verhulst ....................... | 345/97 |
| 5,712,652 A | * | 1/1998 | Sato et al. .................... | 345/90 |
| 5,719,591 A | * | 2/1998 | Callahan, Jr. et al. ........ | 345/98 |
| 5,801,673 A | * | 9/1998 | Shimada et al. ............. | 345/100 |
| 5,812,104 A | * | 9/1998 | Kapoor et al. ................ | 345/76 |

FOREIGN PATENT DOCUMENTS

| | | |
|---|---|---|
| JP | A-5241124 | 9/1993 |
| JP | A-6-186580 | 7/1994 |

* cited by examiner

Primary Examiner—Bipin Shalwala
Assistant Examiner—Vincent E. Kovalick
(74) Attorney, Agent, or Firm—Oliff & Berridge, PLC

(57) ABSTRACT

On a liquid crystal device substrate 1, a capacitor 85 is provided between reset signal lines 81 and 82 for applying reset potentials to the respective data lines prior to the supply of the image signals to the data lines, and a potentiostatic line 84. The capacitor 85 is formed by making use of each of the processes for producing a TFT 50 for applying the reset potentials to the respective data lines prior to the supply of the image signals to the data lines. A liquid crystal device and a projection display device employing the liquid crystal device prevent signals from circulating from data lines via a reset signal line, thus permitting higher quality of display to be achieved.

17 Claims, 18 Drawing Sheets

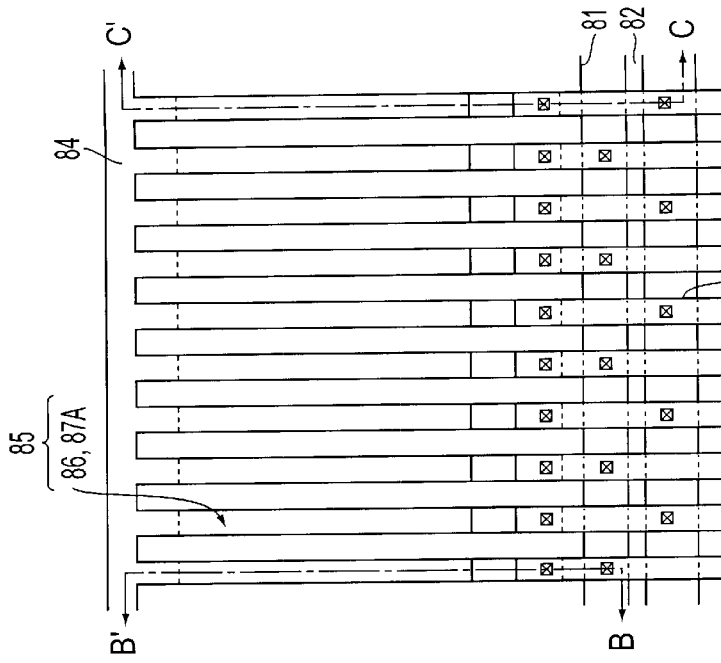
FIG. 4(B)
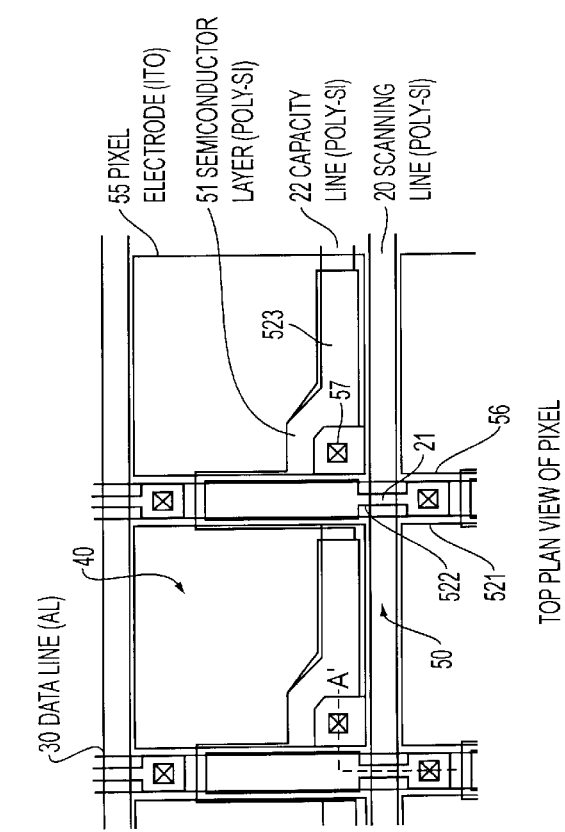
FIG. 4(A)
FIG. 4(C)
FIG. 4(D)

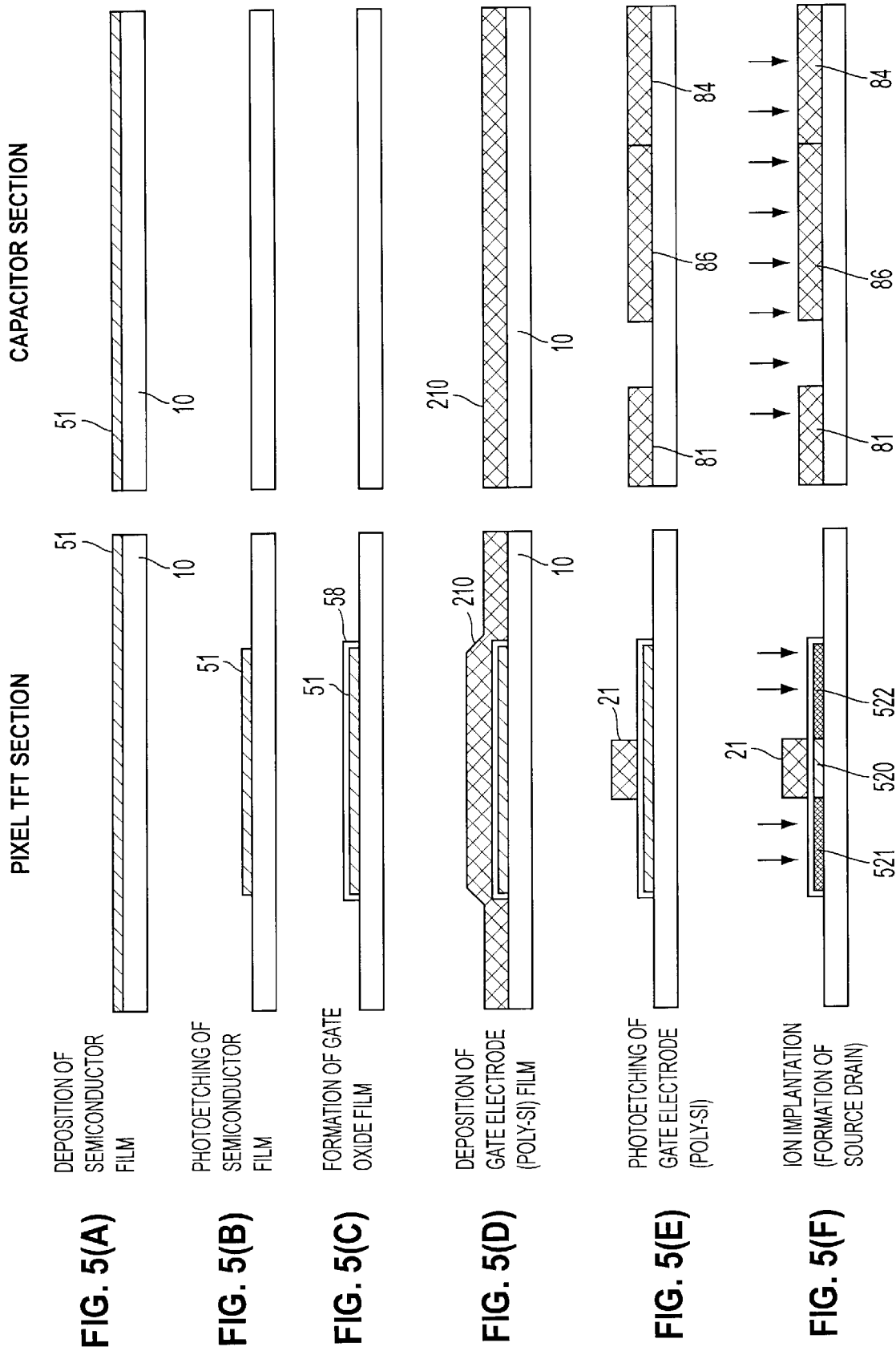

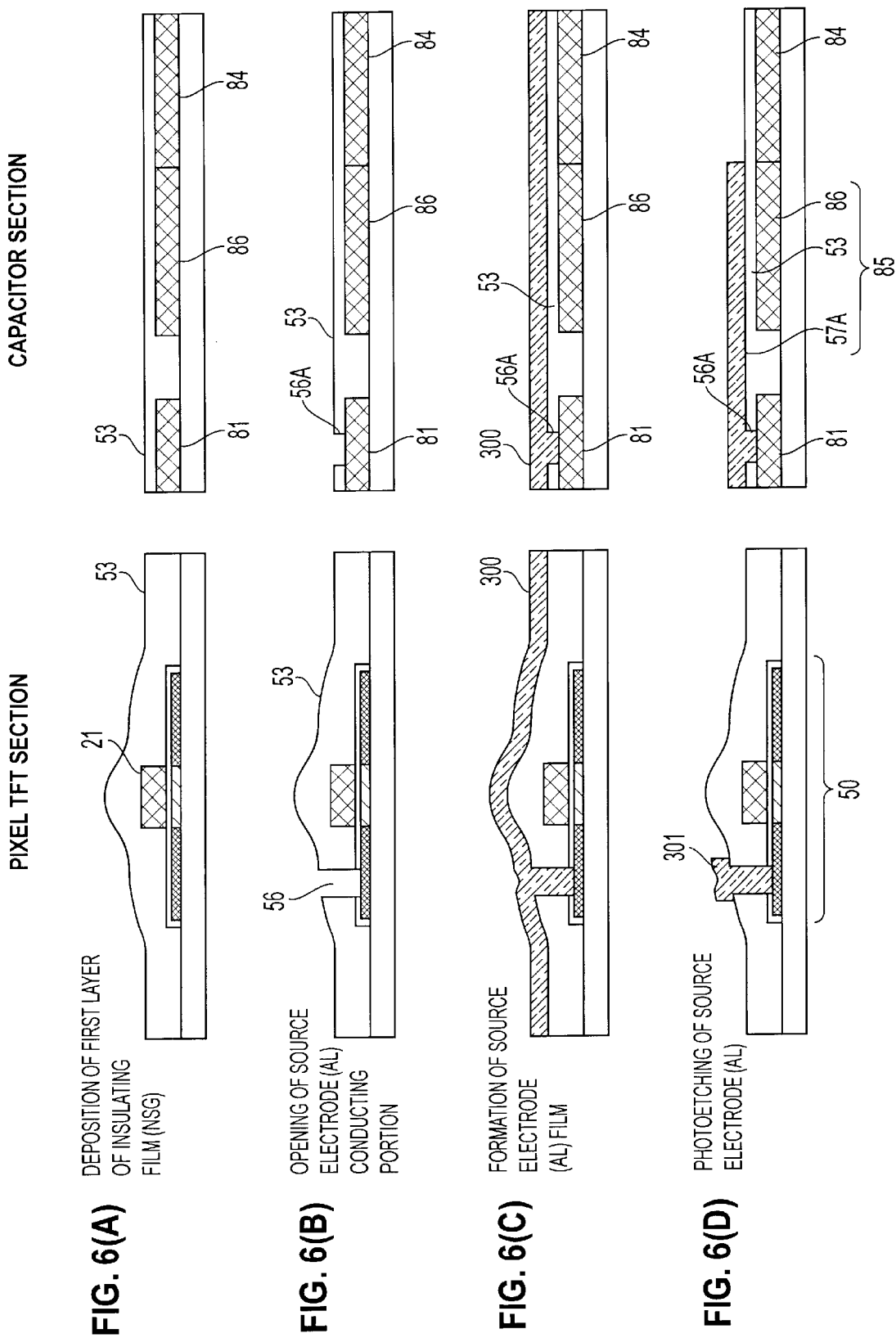

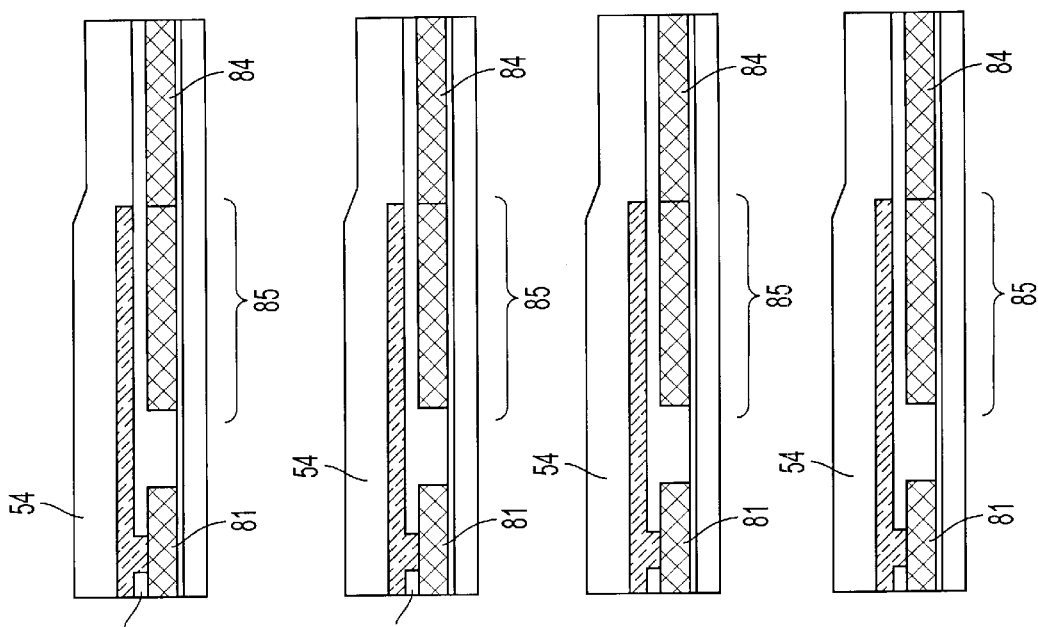
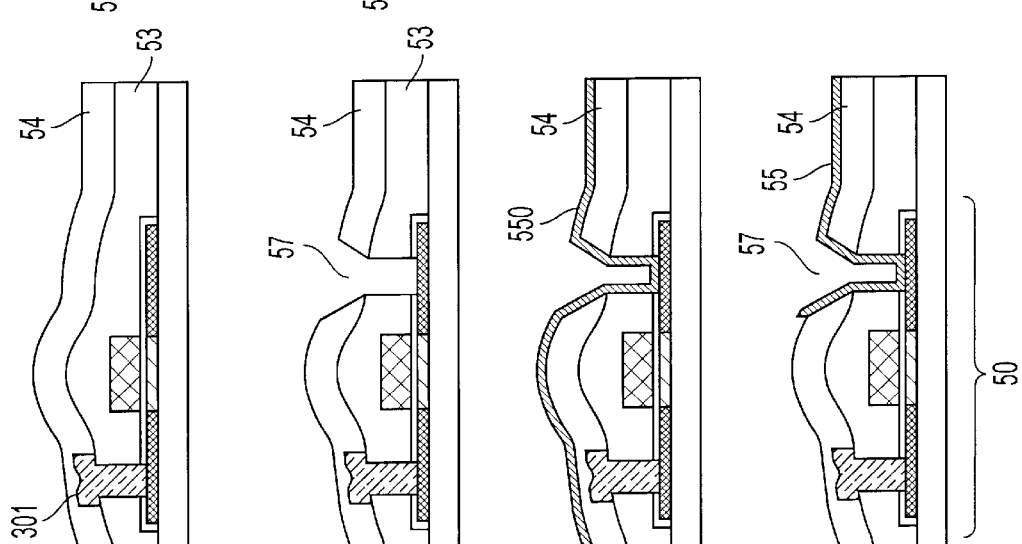
FIG. 7(A) DEPOSITION OF SECOND LAYER INSULATING FILM (BPSG)
FIG. 7(B) OPENING OF PIXEL ELECTRODE (ITO) CONDUCTING PORTION
FIG. 7(C) FORMATION OF PIXEL ELECTRODE (ITO) FILM
FIG. 7(D) PHOTOETCHING OF PIXEL ELECTRODE (ITO) FILM

LIQUID CRYSTAL DEVICE, ELECTRO-OPTICAL DEVICE, AND PROJECTION DISPLAY DEVICE EMPLOYING THE SAME

BACKGROUND OF THE INVENTION

1. Field of the Invention

The present invention relates to an electro-optical device such as a liquid crystal device that uses a liquid crystal device substrate, and a projection display device that employs the same. More particularly, this invention relates to the structure of a type of liquid crystal device and electro-optical device in which reset potentials are applied to respective data lines before image signals are supplied to the data lines.

2. Description of Related Art

Of the liquid crystal device substrates employed for a liquid crystal device, the one having a built-in driving circuit has a pixel section 11 in which pixel areas 40 are defined by a plurality of scanning lines 20 and a plurality of data lines 30 arranged in a matrix pattern on a substrate 10 as shown in the block diagram of FIG. 15. Each pixel area 40 has a pixel switching TFT 50 (thin film transistor) connected to the scanning line 20 and the data line 30, a liquid crystal cell, and a holding capacitor formed between itself and a capacitor line 29. Formed in the area outside (the area around) the pixel section 11 on the substrate 10 are a data side driving circuit section 60 for supplying image signals to each of the plurality of data lines 30 and a scanning side driving circuit section 70 for supplying scan signals to each of the plurality of scanning lines 20. Of these driving circuit sections 60 and 70, the data side driving circuit section 60 has an X-shift register 610 and a sampling circuit 620 equipped with a TFT functioning as an analog switch, so that image signals are supplied to each of the data lines 20 via an image signal line 630.

In a liquid crystal device that employs a liquid crystal device substrate 1 configured as described above, for example, in order to implement a so-called inversion driving system in which image signals invert the polarity of data signals for each line according to the potential of a counter electrode or invert the polarity of the voltage applied to liquid crystal, the image signals supplied to the data lines 30 (a source electrode of the TFT 50) are written to the liquid crystal cell via the TFT 50 while the polarity thereof is inverted for each horizontal scanning period as illustrated in FIG. 16A; hence, the potential of the pixel electrode of the pixel switching TFT changes as shown in FIG. 16B. This means that the polarity of the image signals is inverted for each horizontal scanning period; therefore, the potential of the pixel electrode greatly changes and the charge and discharge from the data lines 30 to the image signal line 620 is accordingly repeated. Such charge and discharge seldom affects the quality of display if the display conforms to the NTSC standard because the sampling rate is relatively low; however, if the display based on HDTV or double speed NTSC is carried out, the charge and discharge leads to the generation of noise because the sampling rate is higher.

To avoid the problem set forth above, a configuration has been proposed wherein a reset driving circuit 80, which is equipped with two series of reset signal lines 81 and 82 for applying reset potentials to the respective data lines 30 before supplying the image signals to the data lines 30 by utilizing a horizontal retrace line zone or the like and a reset potential supply ON/OFF switching circuit 83, are provided in the area outside the pixel section 11 as shown in FIG. 15, so that the charge and discharge from the data lines 30 is almost completed beforehand by the reset potentials. In the liquid crystal device substrate 1, which has this configuration, a reset potential having a predetermined polarity is applied from the reset signal lines 81 and 82 just before image signals are supplied to the data lines 30 as shown in FIG. 16C. Thus, since the charge and discharge from the data lines 30 can be mostly completed before image signals are supplied to the data lines 30, the potential of the pixel electrode changes less with time as illustrated in FIG. 16D, making it possible to restrain the charge and discharge from the data lines 30. This in turn makes it possible to prevent the fluctuation of the potential at the image signal line 630, so that the generation of noises in display can be controlled.

When bonding the liquid crystal device substrate 1 to a counter substrate (not shown) with a predetermined cell gap secured between the substrates, a sealant containing a cell gap material is applied considerably inward from the outer periphery of the liquid crystal device substrate 1 because a counter substrate 5 is smaller than the liquid crystal device substrate 1 as shown in FIG. 15 and FIG. 17, and the liquid crystal device substrate 1 and the counter substrate 5 are bonded by a sealing layer 90 composed of the sealant, the inner area thereof being provided as a liquid crystal sealing area 12. In an example shown in FIG. 17, the sealing layer 90 is formed slightly outside the reset signal lines 81 and 82 in the area outside the pixel section 11. In the area where the sealing layer 90 is formed, the process for forming the scanning lines 20 or the like is directly used to form many dummy patterns 15 in parallel to match the geometric shapes of the data lines on the opposite side, so that these parts are seemingly flat in the entire panel, and the sealant is applied thereto.

SUMMARY OF THE INVENTION

In the conventional configuration wherein the reset potentials are applied to the respective data lines 30 before the image signals are supplied to the data lines 30 so as to perform the charge and discharge from the data lines 30 by the reset potentials, since the pixels arranged laterally are reset at the same time; therefore, signals (electric charges) circulate to other data lines 30 via the reset signal lines 81 and 82 depending on the display pattern in the preceding frame. Such signal circulation appears in terms of a lateral cross talk in display, presenting a problem of deterioration in display quality. These kinds of problems could be prevented by setting time constants of the reset signal lines 81 and 82 sufficiently higher than time constants of the data lines 30; hitherto, however, there has been only one method available by which the width of the data lines 30 is increased to make the time constants of the data lines 30 side relatively smaller, and the method is not adequate to securely prevent the signals from circulating.

Accordingly, the present invention has been made to solve the problem described above and it is an object of the invention to provide a configuration that increases the time constant itself of a reset signal line to prevent signals from circulating from the data lines via the reset signal line, thereby to improve the quality of display in a type of liquid crystal device in which reset potentials are applied to respective data lines before image signals are supplied to the data lines, and also in a type of a projection display that employs the same.

To solve the problem described above, according to the present invention, there is provided a liquid crystal device equipped with: a pair of substrates with liquid crystal sealed in therebetween; a pixel section which is mounted on one of the substrates and is composed of a plurality of data lines to which image signals are supplied, a plurality of scanning lines which cross the plurality of scanning lines and to which scanning signals are supplied, a first switching element connected to the respective data lines and scanning lines, and a pixel electrode connected to the first switching element; and a reset driving circuit provided with a second switching element for supplying a reset signal, which has been supplied to a reset signal conductor, to the data lines prior to the supply of an image signal in the area around the pixel section, and a capacitor which is connected to the second switching element and which stores electric charges, the pair of substrates is a liquid crystal device bonded to each other by a sealing layer formed in the area outside the pixel section. The capacitor is disposed in an area where the sealing layer is formed and has a pair of electrodes, namely, a first electrode to which a predetermined potential is supplied and a second electrode which is electrically connected to the reset signal line and is disposed opposite to the first electrode via an insulating film.

In the liquid crystal device in accordance with the present invention, the first substrate is provided with a capacitor for increasing the time constant for the reset signal line, the capacitor being formed in the area where the sealing layer is formed. Thus, in the liquid crystal device according to the present invention, since the time constant for the reset signal line can be sufficiently larger than that of the time constant for the data lines, no signal sneaks into other data lines via the reset signal line when the reset potentials are applied to the respective data lines. Therefore, even in the case of a type of a liquid crystal device in which the reset potentials are applied to the respective data lines before image signals are supplied to the data lines, the lateral cross talk or the like due to circulation of signals does not occur, making it possible to improve the quality of display. Moreover, the capacitor for increasing the time constant for the reset signal line is conventionally formed in the area where the sealing layer is formed and where there used to be a dead space in the past; hence, even if a capacitor with a larger capacitance is formed, it would not be necessary to increase the size of the liquid crystal device substrate, or it would not be required to reduce the area where liquid crystal is sealed in and the pixel section is included.

According to the invention, the reset signal line may be composed of a plurality of wiring layers arranged in parallel and reset signals having different potentials of the plurality of wiring layers may be supplied. In this case, the second electrode will be electrically connected only to predetermined wiring layers (reset signal line) by electrically connecting the second electrode to the wiring layers via a contact hole.

In the invention, it is preferable that the first electrode is composed of a plurality of electrode layers extended from the potentiostatic line toward the reset signal line, while the second electrode is composed of a plurality of electrode layers extended from the reset signal line toward the potentiostatic line. In other words, it is desirable from the viewpoint of layout to arrange the reset signal conductor and the potentiostatic line in parallel to the periphery of the pixel section; therefore, the area between the reset signal line and the potentiostatic line should be provided as the area where the sealing layer is formed so that a capacitor is fabricated therein by extending the electrode layers from both the reset signal line side and the potentiostatic line side.

Preferably, in the invention, the first electrode and the second electrode are both constituted by electrode layers having various interlayers formed at the same time when one of the scanning lines, the data lines, and the source-drain region of the thin film transistor is formed. By so doing, the capacitor can be formed without adding to the number of manufacturing steps.

For example, there is a case where one of the first and second electrodes is composed of an electrode layer formed at the same time when the scanning lines are formed, while the other electrode is composed of an electrode layer formed at the same time when the data lines are formed. In this case, a dielectric film of the capacitor will be an insulating film that is formed at the same time when the interlayer insulating film of the thin film transistor is formed in the portion where the first electrode and the second electrode overlap each other.

Further there is another case where one of the first and second electrodes is composed of an electrode layer formed at the same time when the scanning lines are formed, while the other electrode is composed of an electrode layer formed at the same time when a source-drain region of the thin film transistor is formed. In this case, a dielectric film of the capacitor will be an insulating film that is formed at the same time when a gate insulating film of the thin film transistor is formed in the portion where the first electrode and the second electrode overlap each other. This composition enables the capacitor to have a larger capacitance (time constant of the reset signal line) because the gate insulating film, which is thinner than the interlayer insulating film, is used as the dielectric film.

Furthermore, there is another case where one of the first and second electrodes is composed of an electrode layer formed at the same time when the scanning lines are formed, while the other electrode is composed of two electrode layers comprised of an electrode layer formed at the same time when the data lines are formed and an electrode layer formed at the same time when a source-drain region of the thin film transistor is formed. In this case, the capacitor includes a first capacitor that employs, as a dielectric film thereof, an insulating film that is formed at the same time when an interlayer insulating film of the thin film transistor is formed in the portion where an electrode layer formed at the same time when the scanning lines are formed overlaps an electrode layer formed at the same time when the data lines are formed, and a second capacitor employs, as a dielectric film thereof, an insulating film that is formed at the same time when a gate insulating film of the thin film transistor is formed in the portion where an electrode layer formed at the same time when the scanning lines are formed overlaps an electrode layer formed at the same time when a source-drain region of the thin film transistor is formed. This composition makes it possible to electrically connect in parallel the first capacitor using an interlayer insulating film as a dielectric film thereof and the second capacitor using a gate insulating film, which is thinner than the interlayer insulating film, as a dielectric film thereof; hence, the capacitance of the capacitors (time constant of the reset signal conductor) can be further increased.

This invention does not have a driving circuit on a liquid crystal device substrate and it can be applied not only to a type of liquid crystal device adapted to receive scanning signals and image signals from outside but also to a liquid crystal device employing a liquid crystal device substrate made integral with a driving circuit that includes a data side driving circuit for supplying the image signals to the data lines or a scanning side driving circuit for supplying scanning signals via the scanning lines.

An electro-optical device in accordance with the present invention has a pixel area including pixel electrodes arranged in a matrix pattern and a first switching element connected to the pixel electrodes, and a driving circuit for driving the pixels disposed around the pixel area on a first substrate, the substrate being bonded to a second substrate by a sealing layer formed in an area outside the pixel section;

wherein a capacitor composed of a first electrode connected to signal lines from the driving circuit and a second electrode formed to be opposed to the first electrode via an insulating film is formed in the area where the sealing layer is formed.

Thus, according to the invention, the capacitor can be formed in the area where sealant is formed to add a capacitance to the signal lines connected to the driving circuit; hence, the time constant of the signal lines can be increased and the area of the sealing layer which used to be a dead space can be effectively utilized, thus obviating the need of increasing the size of the electro-optical device.

According to the invention, there is provided an electro-optical device that has a plurality of data lines to which image signals are supplied, a plurality of scanning lines to which scanning signals are supplied, a first switching element connected to each of the data lines and the scanning lines, and a pixel electrode connected to the first switching element mounted on a first substrate, and further includes a reset driving circuit equipped with a second switching element for supplying reset signals, which have been supplied to a reset signal line prior to the period during which image signals are supplied to the data lines, and a capacitor connected to the reset signal line.

According to the invention, even if a reset driving circuit for resetting at the same time all the image signals applied to the pixel electrode is provided, the total wiring capacitance of the reset signal line or the total ON resistance of the second switching means increases to enable the reset signals to be written to all the data lines. As a result, the potentials of the respective data lines will be all the desired potentials, so that image signals are written under an ideal condition. This prevents uneven contrast.

The electro-optical device such as the liquid crystal device in accordance with the present invention can be employed, for example, as an electronic equipment such as a projection display device that has a light source section and a projecting means for projecting a light beam, which has been emitted from the light source section and modulated by the liquid crystal device onto a projection surface such as a screen.

BRIEF DESCRIPTION OF THE DRAWINGS

FIG. 4A is a top plan view of a pixel switching TFT formed on a liquid crystal device substrate shown in FIG. 1, FIG. 4B is a top plan view showing the configuration of a capacitor added to a reset signal line of the liquid crystal device substrate, FIG. 4C is a sectional view at the line B–B' of FIG. 4B, and FIG. 4D is a sectional view at the line C–C' of FIG. 4B.

FIGS. 5A through 5F are sectional views illustrating the steps for forming the TFT and capacitor shown in FIG. 4.

FIGS. 6A through 6D are sectional views illustrating the steps following the steps shown in FIG. 5.

FIGS. 7A through 7D are sectional views illustrating the steps following the steps shown in FIG. 6.

DETAILED DESCRIPTION OF THE PREFERRED EMBODIMENTS

The following will describe the best modes for carrying out the invention with reference to the accompanying drawings.

(Constitutions of the Entire Liquid Crystal Device Substrate and the Pixel Section)

Figure 1:
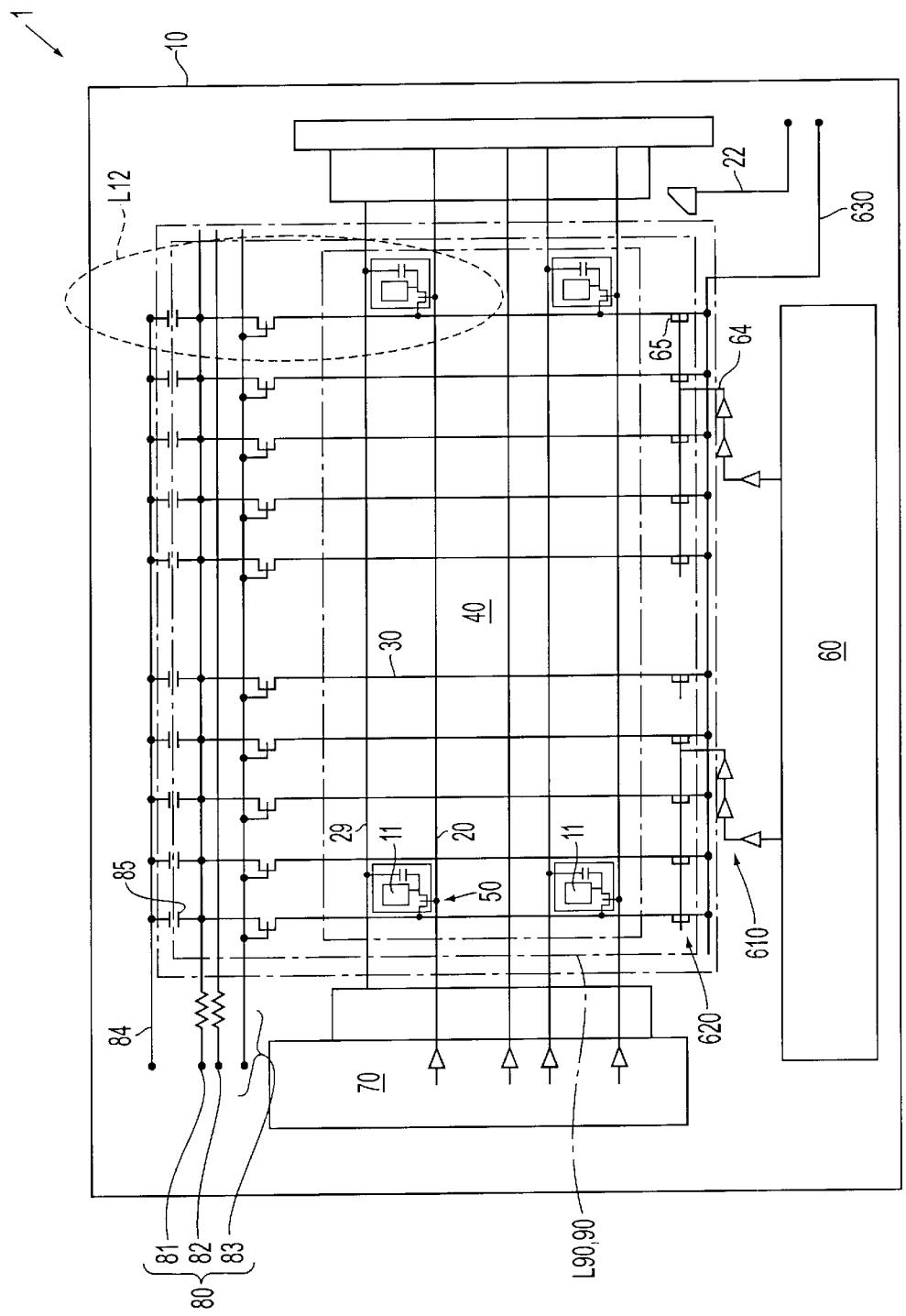
FIG. 1 is a block diagram showing a liquid crystal device substrate of a liquid crystal device in accordance with the present invention.
Figure 2:
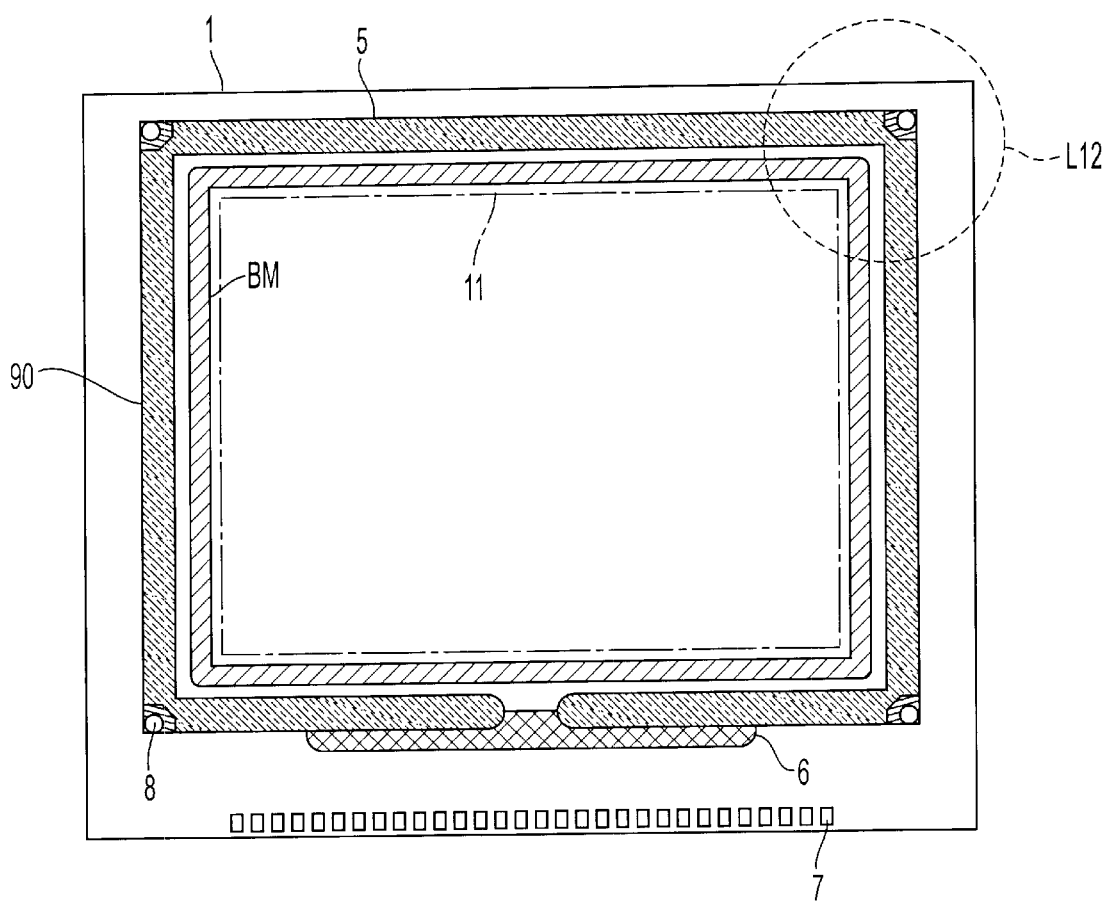
FIG. 2 is a schematic diagram showing the structure in which a counter substrate has been bonded to the liquid crystal device substrate shown in FIG. 1.

FIG. 1 is a block diagram schematically showing the constitution of a liquid crystal device substrate with a built-in driving circuit employed for a liquid crystal display device. FIG. 2 is a schematic diagram showing the structure in which a counter substrate has been bonded to the liquid crystal device substrate. The liquid crystal device substrate in accordance with this embodiment shares the same basic composition as those described in conjunction with FIG. 14, FIG. 15, and FIGS. 16C and 16D; hence, the common parts will be given the same reference numerals.

As seen from FIG. 1, in a liquid crystal device substrate 1 with a built-in driving circuit employed for a liquid crystal device of this embodiment, a pixel section 11 has a plurality of scanning lines 20 to which scanning signals are supplied and a plurality of data lines 30 to which image signals are supplied, and these components are arranged in a matrix pattern on a transparent substrate made of glass or quartz, or a silicon substrate 10. These scanning lines 20 and data lines 30 define pixel areas 40. Formed in each of the pixel areas 40 are a pixel switching TFT 50 (thin film transistor) serving as the switching element connected to the scanning lines 20 and the data lines 30, a liquid crystal cell, and a holding capacitor constituted between the pixel area and a capacitor line 29. On the substrate 10, a data-side driving circuit section 60 that supplies image signals to each of the plurality of data lines 30 and a scanning-side driving circuit section 70 that supplies scanning signals to each of the plurality of scanning lines 20 are formed in the area outside (peripheral area of) the pixel section 11. Of the driving circuits 60 and 70, the data-side driving circuit section 60 has an X-shift resister 610 and a sampling circuit 620 equipped with a TFT serving as an analog switch located more inside than the area where the shift register is formed. The X-shift register 610 and the sampling circuit 620 are connected by a sampling signal input wiring pattern 64, and the sampling circuit 620 and a image signal line 630 are connected by the sampling signal input wiring pattern 64. Hence, when the sampling circuit 620 operates at a predetermined timing in response to a sampling signal output from the X-shift register 610, the image signals supplied via the image signal line 630 are supplied to the respective data lines 20 via the sampling signal input wiring pattern 64.

(Driving Method)

Figure 16:
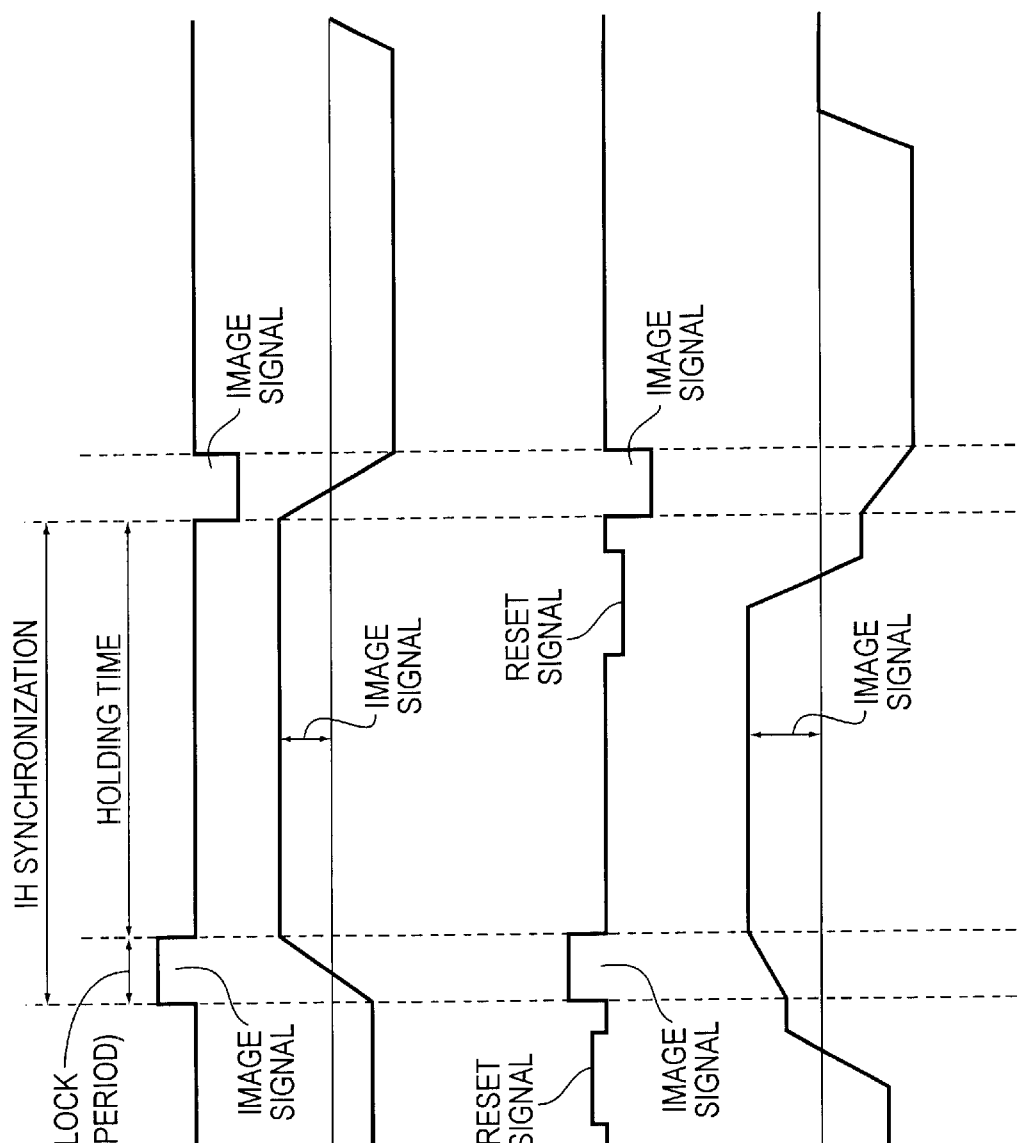
FIG. 16 is a wave form chart for explaining a driving system of a liquid crystal device.
Figure 17:
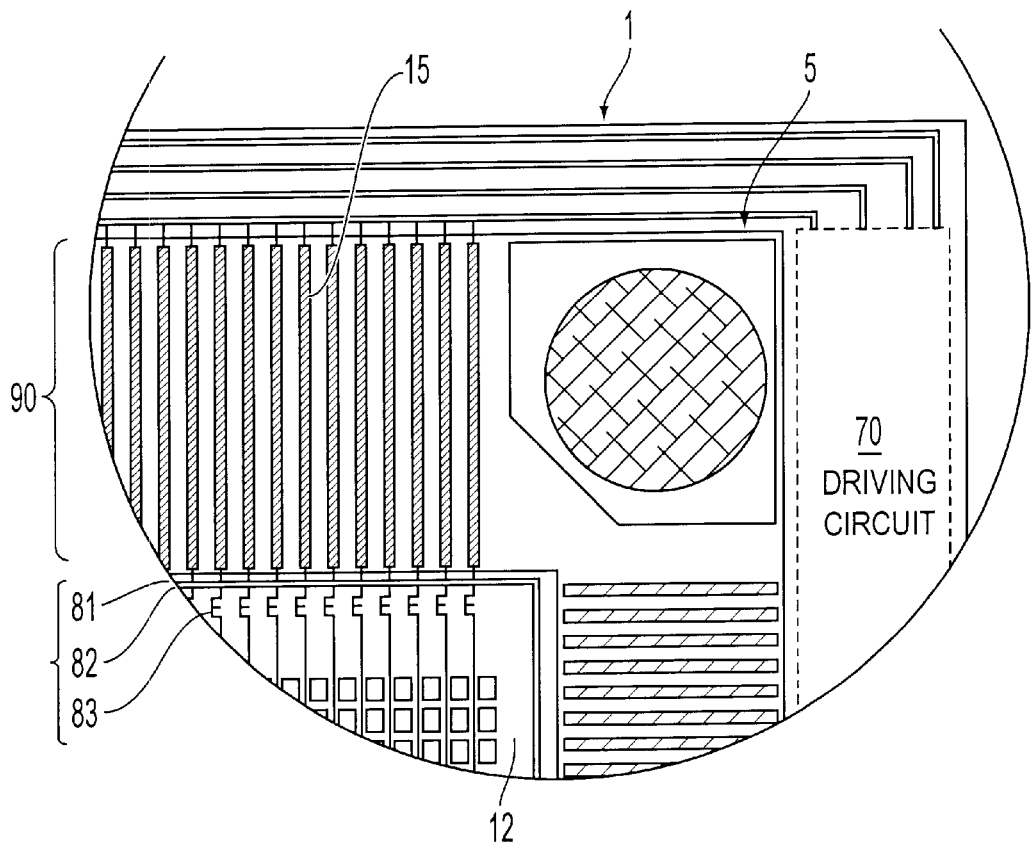
FIG. 17 is a schematic diagram giving an enlarged view of a part of a liquid crystal device substrate of a conventional liquid crystal device.

In the liquid crystal device employing the liquid crystal device substrate 1 configured as described above, to implement, for example, an inversion driving system in which the polarity of image signals are inverted for each line (the phase of the image signal is inverted), the image signals supplied to the data lines 30 (a source electrode of a TFT 50) are written to a liquid crystal cell via the TFT 50 while the polarity thereof is inverted for each horizontal scanning period as described with reference to FIG. 16C. Hence, charge and discharge is repeated via the data lines 30; in this embodiment, reset potentials are applied to the respective data lines 30 by using horizontal retrace line zone or the like before image signals are supplied to the data lines 30 as described with reference to FIG. 16D so as to prevent the charge and discharge from causing noise or the like in display even when the rate of sampling from the image signal lines is high. More specifically, as shown in FIG. 1, a reset driving circuit 80, which is equipped with two series of reset signal lines 81 and 82 for applying the reset potentials to the respective data lines 30 before the image signals are supplied to the data lines 30, and the reset potential supply ON/OFF switching circuit 83, are provided in the outer peripheral area of the pixel section 11.

(Configuration for Increasing the Time Constant of the Reset Signal Lines)

Further, in the liquid crystal device substrate 1 of this embodiment, a potentiostatic line 84 is provided in parallel to the reset signal lines 81 and 82 in the area located farther outside than the reset signal lines 81 and 82. A capacitor 85 is provided between the potentiostatic line 84 and the reset signal lines 81 and 82. The potentiostatic line 84 is set at the same potential as that of the counter electrode of the counter substrate bonded to the liquid crystal device substrate 1 as in the case of, for example, the capacitor line 29 or a common line 22; the potential corresponds to. a intermediate potential of the amplitude of the image signal or the reset signal shown in FIG. 16C or 16D.

Accordingly, the liquid crystal device substrate 1 of this embodiment has the capacitor 85 between the reset signal lines 81 and 82 and the potentiostatic line 84, so that the time constants of the reset signal lines 81 and 82 are larger. This prevents signals from circulating to other data lines 30 via the reset signal lines 81 and 82 when the reset potentials are applied to the respective data lines 30. Hence, even in the case of a type of liquid crystal device, in which the reset potentials are applied to the respective data lines 30 before image signals are supplied to the data lines 30, a lateral cross talk or the like due to circulation of signals does not occur, thus permitting improved quality of display.

A specific example of a value C2 of the capacitor 85 in relation to a capacitance C1 of the data line will be described. For instance, if a central potential of an image signal is Vc=6V, the potential of a reset signal is Vc±6V, and the writing time of the reset signal is shorter than the time constant of the wiring, then $$Vc=(Q1+Q2)/(C1+C2)=(V\,VID\cdot C1+V\,NRS\cdot C2)/(C1+C2)=6$$

where Q1 denotes the amount of electric charge of the image signal; Q2 denotes the amount of electric charge of the reset signal; V VID denotes the potential of the image signal; and V NRS denotes the potential of the reset signal.

Developing the formula gives $$C2=C1\cdot(6-V\,VID)/(V\,NRS-6)$$

If V NRS is set to −6V, which is the maximum negative amplitude value, and V VID is set to (6/2) V, taking the half of the maximum amplitude as the mean value, then V NRS=Vc−6=0 and V VID=Vc+(6/2) V=9; therefore, $$C2 \geq C1\cdot 3/6 = C1\cdot 1/2$$

Accordingly, the value of the capacitor is preferably larger than ½ of the total capacitance of the data lines.

(Structure of Bonding the Liquid Crystal Device Substrate and the Counter Substrate)

As shown in FIG. 2, the liquid crystal device substrate 1 constructed as described above is bonded to a transparent counter substrate 5 equipped with a counter electrode and a black matrix BM by a sealing layer 90, to which a sealant containing a cell gap material has been applied, then liquid crystal is sealed in between the substrates. As the sealing layer 90, an epoxy resin or various types of ultraviolet-curing resins may be used. As the cell gap material, metal balls of about 5 µm to about 10 µm or resinous balls coated with metal may be used.

In this case, the counter substrate 5 is smaller than the liquid crystal device substrate 1; hence, the peripheral portion of the liquid crystal device substrate 1 is bonded beyond the outer periphery of the counter substrate 5. Thus, I/O terminals 7 of the liquid crystal device substrate 1 are left exposed even after the liquid crystal device substrate 1 and the counter substrate 5 are bonded. The liquid crystal device substrate 1 and the counter substrate 5 are set at a common potential by upper and lower conducting members 8. The sealing layer 90 is partially discontinued to allow liquid crystal to be sealed in through the discontinued portion even after the counter substrate 5 and the liquid crystal device substrate 1 are bonded together. After the liquid crystal is sealed in, the discontinued portion is sealed with a sealant 6.

Figure 3:
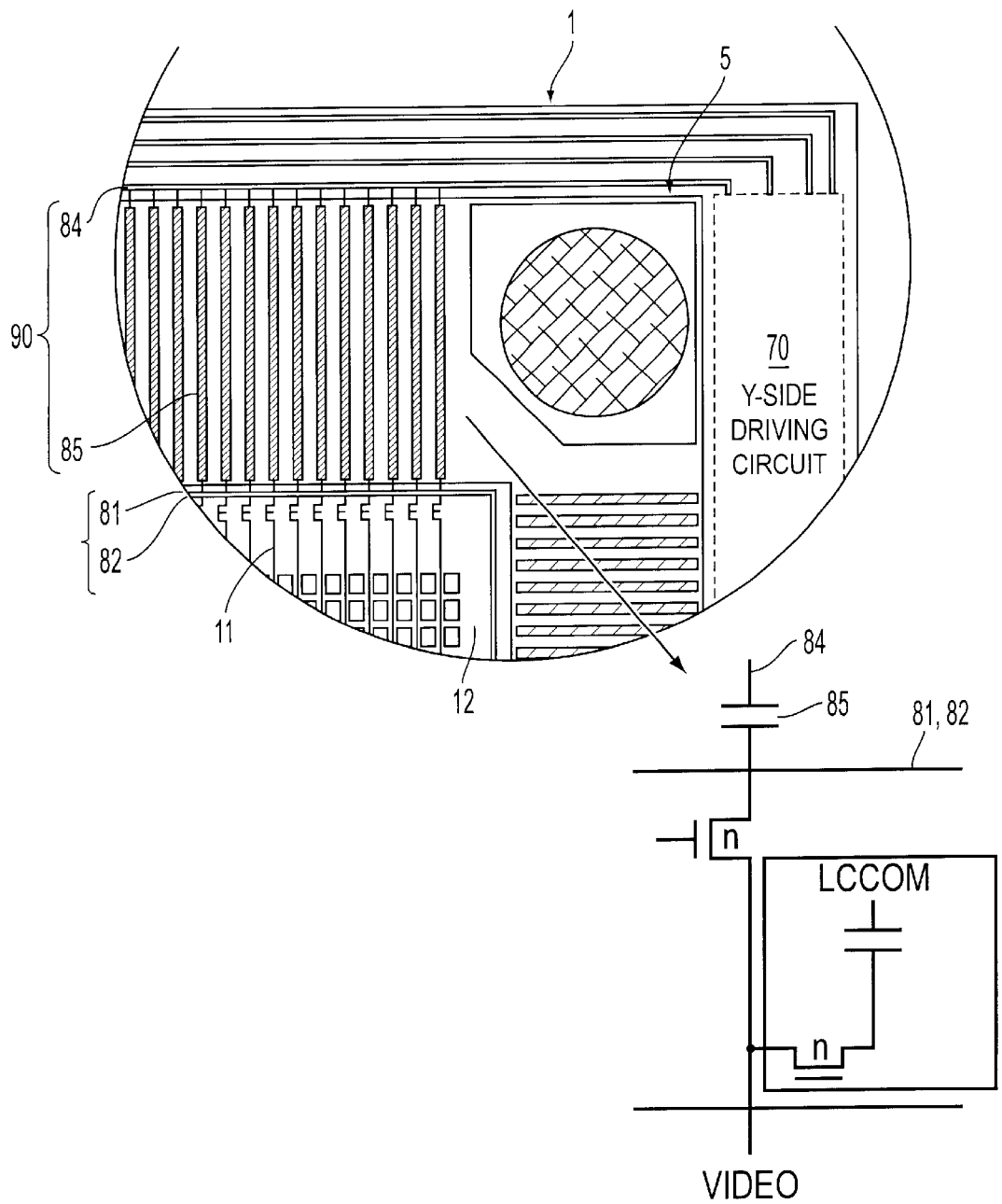
FIG. 3 is an enlarged schematic diagram illustrating the area indicated by L12 in FIG. 2.

In this embodiment, the bonding structure is implemented as shown in FIG. 3 giving an enlarged view of a part of the liquid crystal device substrate 1 (the part enclosed by dashed line L12 in FIG. 1 and FIG. 2). Since the counter substrate 5 is smaller than the liquid crystal device substrate 1, the sealant containing the cell gap material is applied to the area located considerably inward from the outer periphery of the liquid crystal device substrate 1 so as to bond the liquid crystal device substrate 1 and the counter substrate 5 by the sealing layer 90 composed of the sealant; the inner area is provided as a liquid crystal sealing area 12. The sealing layer 90 may be formed in a portion of the area outside the pixel section 11, the portion being located between the potentiostatic line 84 and the reset signal lines 81 and 82.

(Configuration of the Capacitor)

The area where the sealing layer 90 is formed for bonding the liquid crystal device substrate 1 and the counter substrate 5 together as described above used to be a dead space, whereas the area where the sealing layer 90 is formed is utilized to build the foregoing capacitor 85 in the liquid crystal device substrate 1 in this embodiment. More specifically, as will be discussed in detail later, in this embodiment, the reset signal lines 81 and 82 and the potentiostatic line 84 are arranged in parallel in the peripheral area of the pixel section 11 because of layout restrictions, and the area between these reset signal lines 81 and 82 and the potentiostatic line 84 is used as the area where the sealing layer 90 is formed. Hence, a plurality of electrode layers extended from the reset signal lines 81 and 82 toward the potentiostatic line 84 and a plurality of electrode layers extended from the potentiostatic line 84 toward the reset signal lines 81 and 82 are stacked via a dielectric film in the area where the sealing layer 90 is formed thereby to compose the capacitor 85. Thus, since the liquid crystal device employing the liquid crystal device substrate 1 of this embodiment has the capacitor 85 formed in the area which is utilized for forming the sealing layer 90 and which used to be a dead space in the past, a capacitor 85 with a larger capacitance can be provided without the need of increasing the size of the liquid crystal device substrate 1 or decreasing the size of, for example, the liquid crystal sealing area 12 including the pixel section 11.

In the area where the sealing layer 90 is formed, periodic irregularities are formed for the scanning lines 20 and the data lines 30. If these configurations are uneven vertically or horizontally in the liquid crystal sealing area 12, then the symmetry of the entire area where the sealing layer 90 is formed is ruined, seriously preventing the formation of a uniform cell gap. This is especially marked when a photo-curing sealant is used; the curing condition depends on the difference in the amount of light passing through the liquid crystal device substrate 1, so that optical symmetry must be also maintained. The capacitor 85 can be composed of many electrodes without damaging the symmetry, therefore, bonding the liquid crystal device substrate 1 and the counter substrate 5 together after applying the sealant to the area permits a predetermined cell gap to be secured between the substrates.

If an aluminum layer or the like is formed in the outer peripheral area of the liquid crystal device substrate 1 to form the sealing layer 90 therein and the sealing layer 90 is subjected to photo-curing, then ultraviolet rays must be radiated from the counter substrate 5, imposing a restriction in that the counter substrate 5 must use a quartz substrate or the like that has considerably high optical transparency. In contrast to this, in this embodiment, even when the ultraviolet rays are radiated from the side of the liquid crystal device substrate 1, the ultraviolet rays pass through the gap between the wiring layers to reach the sealing layer 90 to cure it, so that the requirements on the optical transparency of the counter substrate 5 can be alleviated. This means that the embodiment is also advantageous in that an inexpensive glass substrate can be used for the counter substrate 5.

(Sealing Structure Around the Data-side Driving Circuit and the Scanning-side Driving Circuit)

As described above, since the electrodes are stacked on top of each other in the area where the capacitor 85. is formed, the stacked portion (the cell gap adjusting area) is one-stage higher than the area surrounding it. Hence, in the area around the data-side driving circuit and the scanning-side driving circuit, the height of the cell gap adjusting area is adjusted, for example, as set forth below.

As shown in FIG. 1, the area where the sealing layer 90 is formed is schematically illustrated by a chain line L90. On the data-side driving circuit section 60, the sealing layer 90 is formed so that it overlaps a sampling signal input wiring pattern 64 and an image signal sampling wiring pattern 65. A dummy wiring layer (not shown) or the like is stacked on the wiring patterns to match the height of the cell gap adjusting area. At this time, the dummy wiring layer is electrically connected via a contact hole to the sampling signal input wiring pattern 64 and the image signal sampling wiring pattern 65 to make a redundant wiring structure. Similarly, on the scanning-side driving circuit section 70, a dummy wiring layer (not shown) is stacked on the scanning lines 30 and the capacitor lines 29 around the driving circuit to match the height of the foregoing cell gap adjusting area, so that the area can be utilized for forming the sealing layer 90. In this case also, the dummy wiring layer may be electrically connected via a contact hole to the scanning lines 30 and the capacitor lines 29 to make the redundant wiring structure.

Thus, the area outside the sealing layer 90 can be expanded to provide a larger area where circuits can be formed by utilizing the area in which the sealing layer 90 is formed and which used to be a dead space, as the area for forming the sampling signal input wiring pattern 64 and the image signal sampling wiring pattern 65. This enables the data-side driving circuit section 60 to increase ON current (higher operating speed) by expanding the channel width of the TFT composing it or to use a larger-scale circuit. In other words, the area outside the sealing layer 90 can be made smaller because a sampling circuit 620 is provided in the portion located farther inside from the sealing layer 90. This makes it possible to compose a liquid crystal device that provides a display area of the same size with a smaller peripheral area. Although the sampling circuit 620 is located in the liquid crystal sealing area 12, the sampling circuit 620 does not deteriorate the liquid crystal. Besides, the sampling circuit 620 is covered with black matrix BM, and the quality of display will not be affected even if the liquid crystal of that portion should deteriorate.

(Composition of TFT)

FIGS. 4A, 4B, 4C, and 4D are a top plan view of a pixel switching TFT formed on a liquid crystal device substrate shown in FIG. 1, a top plan view showing the configuration of a capacitor added to a reset signal line of the liquid crystal device substrate, a sectional view at the line B–B' of FIG. 4B, and a sectional view at the line C–C' of FIG. 4B, respectively.

As shown in FIG. 4A with an enlarged view of a part of the pixel section 11 (pixel area 40), a pixel switching TFT 50 is provided for each pixel area 40. The pixel switching TFT 50 is formed equipped with: a semiconductor film 51 (an active layer of the TFT) made of a polysilicon film formed to partially overlap the data line 30 at the side of the lower layer of the data line 30, which is composed of an aluminum film or the like; and a gate electrode 21 which is composed of a polysilicon film or the like formed between the layers different from the semiconductor film 51 or the data line 30 and which is made of a part of the scanning line 20. In the TFT 50, a source region 521 and a drain region 522 are formed in a self-aligned fashion on the semiconductor film 51 in relation to the gate electrode 21. The data line 30 is electrically connected to the source region 521 via a contact hole 56, while a pixel electrode 55 is electrically connected to the drain region 522 via a contact hole 57. In FIG. 4A, the capacitor line 29 shown in FIG. 1 has been omitted.
(Composition Example 1 of the Capacitor)

In constituting the foregoing capacitor 85 to be added to the reset signal lines 81 and 82 in any one of the following examples to be explained, the electrodes for making up the capacitor 85 will be composed of the electrode layers having different interlayers that are formed at the same time as one of the scanning line 20 (the gate electrode 21), the data line 30, and the source region 521 and the drain region 522 of the TFT 50 shown in FIG. 4A is formed.

For instance, in the example shown in FIGS. 4B, 4C, and 4D, the reset signal lines 81, 82 and the potentiostatic line 84 are all wiring layers composed of a polysilicon film formed at the same time as the scanning line 20 (the gate electrode 21 of the TFT 50) is formed. Of the two electrodes constituting the capacitor 85, a first electrode 86 located at the lower layer side is an extended portion coming from the potentiostatic line 84 toward the reset signal lines 81 and 82 and it is an electrode layer composed of a polysilicon film formed at the same time when the reset signal lines 81 and 82 and the scanning line 20 (the gate electrode 21 of TFT 50) are formed. A second electrode 87A located at the upper layer side is an electrode layer composed of an aluminum layer formed at the same time when the data line 30 (the source electrode of the TFT 50) is formed. It is electrically connected to the reset signal lines 81 and 82 via a contact hole 56A. The electrode layer electrically connected via the contact hole 56A to the reset signal lines 81 and 82 is used as the second electrode 87A because the reset signal lines 81 and 82 are in the same layer, so that the second electrode 87A to be electrically connected to the reset signal line 82 needs to be extended toward the potentiostatic line 84 rather than being electrically connected to the reset signal line 81. The capacitor 85 of this embodiment will employ, as a dielectric film thereof, an insulating film which is formed at the same time as the interlayer insulating film of the TFT 50 is formed in the portion where the two electrodes 86 and 87A overlap.

The method for manufacturing the capacitor 85 having the foregoing composition will be described with reference to FIG. 5 through FIG. 7. These diagrams are sectional views illustrative of the steps of the manufacturing method of the liquid crystal device substrate of this embodiment. In each of the diagrams, the sectional view at the line A–A' in FIG. 4A is given on the left side, while the sectional view at the line B–B' in FIG. 4B is given on the right side. In the sectional view at the line B–B' of FIG. 4B, the reset signal line 82 does not appear, the reset signal lines 81 and 82 share the same basic composition, and therefore, the description of the reset signal line 82 will be omitted.

First, as shown in FIG. 5A, on both the pixel TFT section and the capacitor section, the semiconductor film 51 composed of a polysilicon film is formed by the low pressure CVD or the like to a thickness of about 500 angstroms to about 2000 angstroms, preferably about 1000 angstroms, directly over the entire surface of a transparent substrate or a silicon substrate 10 made of a glass substrate such as a non-alkali glass substrate, or over the entire surface of the substrate protection film formed on the surface of the substrate 10 (semiconductor film deposition process). Then, the semiconductor film is subjected to patterning by the photolithography technique to obtain the island-like semiconductor film 51 (active layer) on the pixel TFT section as shown in FIG. 5B. To form the semiconductor film 51, an amorphous silicon film is deposited, then it is subjected to thermal annealing at a temperature of about 600 degrees Celsius to about 700 degrees Celsius for about 1 hour to about 8 hours to form it into a polysilicon film. In another method for forming the semiconductor film, the polysilicon film is deposited and silicon is implanted to make it amorphous, then the thermal annealing is performed for re-crystallization thereby to form the polysilicon film. On the capacitor section, the semiconductor film 51 is completely removed (semiconductor film photo-etching process).

Next, as shown in FIG. 5C, a gate oxidation film 58 having a thickness of about 600 angstroms to about 1500 angstroms is formed on the surface of the semiconductor film 51 by the thermal oxidation method or the like (gate oxidation film forming process). As a result, the semiconductor film 51 has a thickness of about 300 angstroms to about 1500 angstroms, preferably 350 angstroms to about 450 angstroms.

Then, as shown in FIG. 5D, a polysilicon film 210 for forming such as the gate electrode is formed all over the surface of the substrate 10 (gate electrode polysilicon film depositing process), and the photolithography technique is used to perform patterning as illustrated in FIG. 5E to form the gate electrode 21 on the pixel TFT section side. On the capacitor section side, the polysilicon film is left as the potentiostatic line 84, the first electrode 86, and the reset signal line 81 (gate electrode polysilicon film photo-etching process).

In the next step, as shown in FIG. 5F, on the pixel TFT section side, impurity ions (phosphorous ions) of high concentration are implanted (ion implantation process), using the gate electrode 21 as the mask, thereby to form a high-concentration source region 521 and a high-concentration drain region 522 in a self-aligned fashion in relation to the gate electrode 21. The portion into which no impurity has been implanted because of its location right under the gate electrode 21 provides a channel region 520. At the time of the ion implantation, the impurities are introduced into the polysilicon films formed as the gate electrode 21, the potentiostatic line 84, the first electrode 86, and reset signal line 81, so that they will have lower resistance.

As an alternative, the following manufacturing process may be implemented. Using the gate electrode 21 as the mask, low-concentration impurities (phosphorous ions) in a dose of about $1 \times 10^{13}/cm^2$ to about $3 \times 10^{13}/cm^2$ are introduced to form a low-concentration region on the polysilicon film, then a mask wider than the gate electrode 21 is formed and high-concentration impurities (phosphorous ions) are implanted in a dose of about $1 \times 10^{15}/cm^2$ to about $3 \times 10^{15}/cm^2$ thereby to form the source region and the drain region of an LDD structure (lightly doped drain structure). Further alternatively, the source region and the drain region of an offset structure may be formed by implanting the high-concentration impurities (phosphorous ions) in condition of forming a mask wider than the gate electrode 21, without implanting the low-concentration impurities.

Although it is not illustrated, when forming the above mentioned n-channel portion, a p-channel type TFT of the peripheral driving circuit is covered with a resist mask beforehand. Likewise, when forming a p-channel portion on the peripheral driving circuit, the pixel sections 11 and the n-channel type TFT are covered with a resist mask to protect them. Under this condition, by using the gate electrode 21 as the mask, boron ions are implanted in a dose of about $1\times10^{15}/cm^2$ to about $3\times10^{15}/cm^2$ thereby to form a p-channel source-drain region in a self-aligned fashion. Alternatively, as in the case of forming the n-channel, the low-concentration source-drain region may be formed by introducing low-concentration impurities (boron ions) in a dose of about $1\times10^{13}/cm^2$ to about $3\times10^{13}/cm^2$ with the gate electrode 21 used as the mask, then a mask wider than the gate electrode 21 is made to implant high-concentration impurity ions (boron ions) to form the LDD structure. As a further alternative, the source-drain region of the offset structure may be constructed. The ion implantation enables a complementary type to be achieved, thus permitting the peripheral driving circuits to be mounted on the same substrate.

As shown in FIG. 6A, a first interlayer insulating film 53 composed primarily of an NSG film (a silicate glass film not containing boron or phosphor) having a thickness of about 5000 angstroms to about 15000 angstroms is formed at a temperature of, e.g. approximately 800 degrees Celsius, by CVD or the like on the surfaces of the gate electrode 21, the potentiostatic line 84, the first electrode 86, and the reset signal line 81 (first interlayer insulating film depositing process). In the first interlayer insulating film 53, the portion formed on the surface of the first electrode 86 provides the dielectric film of the capacitor 85.

Next, as illustrated in FIG. 6B, using the photolithography technique, the contact holes 56 and 56A are formed in the portions corresponding to the source region 521 and the reset signal line 81 in the first interlayer insulating film 53 (source electrode conducting portion opening process).

Then, as shown in FIG. 6C, a low-resistance conducting film such as an aluminum film 300 for composing the source electrode is formed on the surface of the first interlayer insulating film 53 by sputtering or the like (source electrode aluminum film depositing process). After that, the aluminum film 300 is subjected to patterning by the photolithography technique to form a source electrode 301 as a part of the data line 30 in the pixel TFT section and to form a second electrode 57A to be electrically connected to the reset signal line 81 via the contact hole 56A in the capacitor section as shown in FIG. 6D (source electrode aluminum film photo-etching process).

Thus, the capacitor 85 is constituted between the reset signal line 81 and the potentiostatic line 84 by the first electrode 86, the first interlayer insulating film 53, and the second electrode 57A.

Subsequently, as shown in FIG. 7A, a second interlayer insulating film 54 composed primarily of a PSG film (a silicate glass film containing boron or phosphor) having a thickness of about 5000 angstroms to about 15000 angstroms is formed at a low temperature of, e.g. approximately 500 degrees Celsius, by CVD or the like on the surfaces of the source electrode 301 and the second electrode 57A (the second interlayer insulating film forming process). Then, as shown in FIG. 7B, in the pixel TFT section side, by using the photolithography technique and the dry etching process, a contact hole 57 is formed in the portion corresponding to the drain region 522 in the first interlayer insulating film 53 and the second interlayer insulating film 54 (pixel electrode conducting portion opening process).

Next, as illustrated in FIG. 7C, an ITO film 550 (Indium Tin Oxide) having a thickness of about 1500 angstroms for composing the drain electrode is formed by sputtering or the like on the surface of the second interlayer insulating film 54 (pixel electrode ITO film depositing process). After that, as shown in FIG. 7D, by using the photolithography technique, the ITO film 550 is subjected to patterning so as to form the pixel electrode 55 at the pixel TFT section and to completely remove the ITO film 550 from the capacitor section. The material used for the pixel electrode 55 is not limited to the ITO film; it may be a transparent electrode material made of a metal oxide such as a SnOx film or a ZnOx film having a high melting point. These materials will survive the step coverage in the contact hole 57.

Thus, according to the embodiment, the first electrode 86 can be formed by making use of the process for forming the gate electrode 21 (scanning line 20) of the TFT 50, and the second wiring layer 57A can be formed as the second electrode by making use of the process for forming the source electrode 301 (data line 30) of the TFT 50; hence, the capacitor 85 can be produced without adding to the number of manufacturing steps.

(Composition Example 2 of the Capacitor)

Figure 8A:
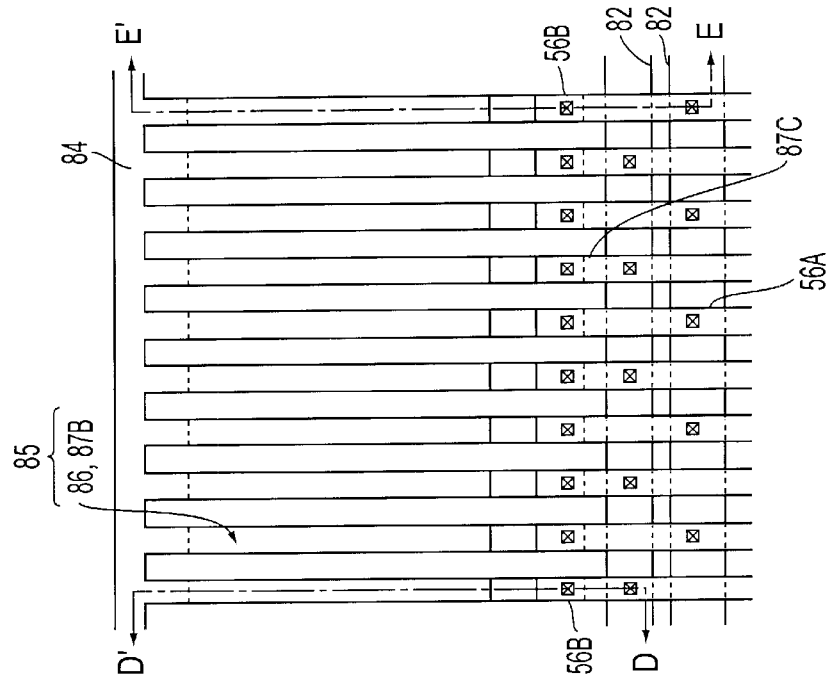
FIG. 8A is a top plan view showing the configuration of a capacitor added to a reset signal line of a liquid crystal device substrate according to an improvement example of the invention.
Figure 8B:
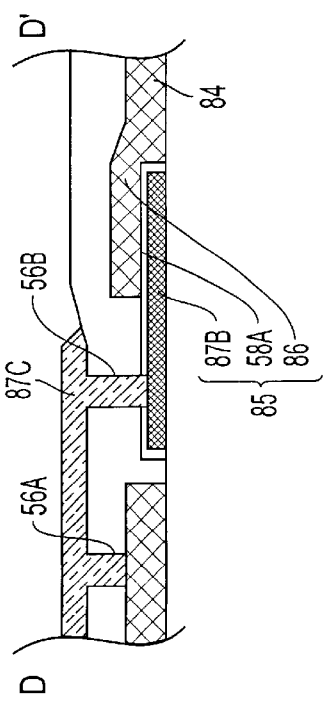
FIG. 8B is a sectional view at the line D–D' of FIG. 8A.
Figure 8C:
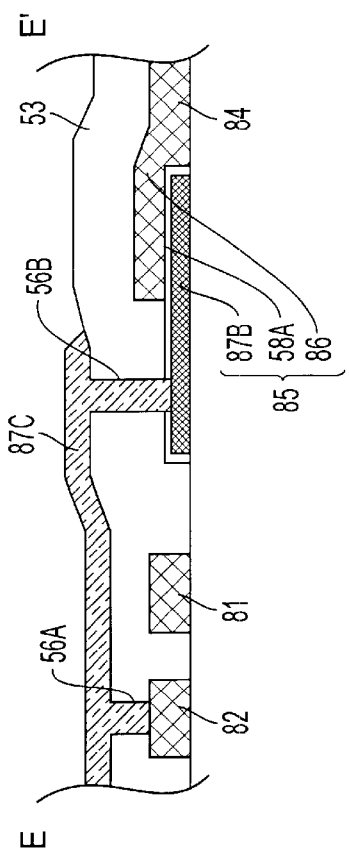
FIG. 8C is a sectional view at the line E–E' of FIG. 8B.

FIGS. 8A, 8B, and 8C are a top plan view illustrating the composition of the capacitor added to the signal lines of the liquid crystal device substrate related to an improved example of the foregoing embodiment, a sectional view at the line D–D' of FIG. 8A, and a sectional view at the line E–E' of FIG. 8B, respectively.

In composition example 1 of the capacitor, the electrode layer is formed at the same time when the data line 30 is formed and is formed as the second electrode 87A electrically connected to the reset signal lines 81 and 82; in this composition example, however, the electrode layer formed at the same time when the source region 521 and the drain region 522 of the TFT 50 are formed may be employed as a second electrode 87B as shown in FIGS. BA, BB, and 8C. In the example shown in FIGS. 8A, 8B, and 8C, the reset signal lines 81 and 82 and the potentiostatic line 84 are all the wiring layers composed of the polysilicon films formed at the same time when the scanning line 20 (the gate electrode 21 of the TFT 50) is formed. Of the two electrodes constituting the capacitor 85, the first electrode 86 positioned at the upper layer side is comprised of a portion extending from the potentiostatic line 84 toward the reset signal lines 81 and 82, and it is the electrode layer 86 made of the polysilicon film formed at the same time when the reset signal lines 81 and 82 and the scanning line 20 (the gate electrode 21 of the TFT 50) are formed.

A second electrode layer 58A is an electrode layer composed of the polysilicon film formed at the same time as the source region 521 and the drain region 522 of the TFT 50 are formed, so that it is formed at a lower layer side than the first electrode 86. Since the two reset signal lines 81 and 82 lie in the same layer, a wiring layer 87C made of an aluminum film formed at the same time when the data line 30 (the source electrode 301 of the TFT 50) is formed is employed to make electrical connection between the reset signal line 82 and the corresponding second electrode 87B over the reset signal line 81. In other words, the wiring layer 87C is electrically connected to the reset signal lines 81 and 82 via the contact hole 56A and also electrically connected to the second electrode 87B via a contact hole 56B. Therefore, in the case of this embodiment, the capacitor 85 will have, as the dielectric film thereof, the insulating film 58A formed at the same time when the gate insulating film 58 of the TFT 50 is formed at the portion where the foregoing two electrode layers 86 and 87B overlap.

Thus, if the capacitor 85 is produced between the reset signal lines 81 and 82 and the potentiostatic line 84 by the first electrode 86, the dielectric film 58A formed at the same time when the gate insulating film 58 is formed, and a second electrode 57B, then the first electrode 86 can be formed by making use of the process for forming the gate electrode 21 (the scanning line 20) of the TFT 50, and the second wiring layer 57B can be formed by making use of the process for forming the source region 521 and the drain region 522 of the TFT 50. This enables the capacitor 85 to be formed without increasing the number manufacturing steps. In addition, in this composition example, the capacitor 85 will provide a larger capacitance because it employs, as the dielectric film thereof, the insulating film 58A formed at the same time when the gate insulating film 58, which is thinner than the first interlayer insulating film 53, is formed. This in turn makes it possible to set larger time constants of the reset signal lines 81 and 82.

(Composition Example 3 of the Capacitor)

Figure 9A:
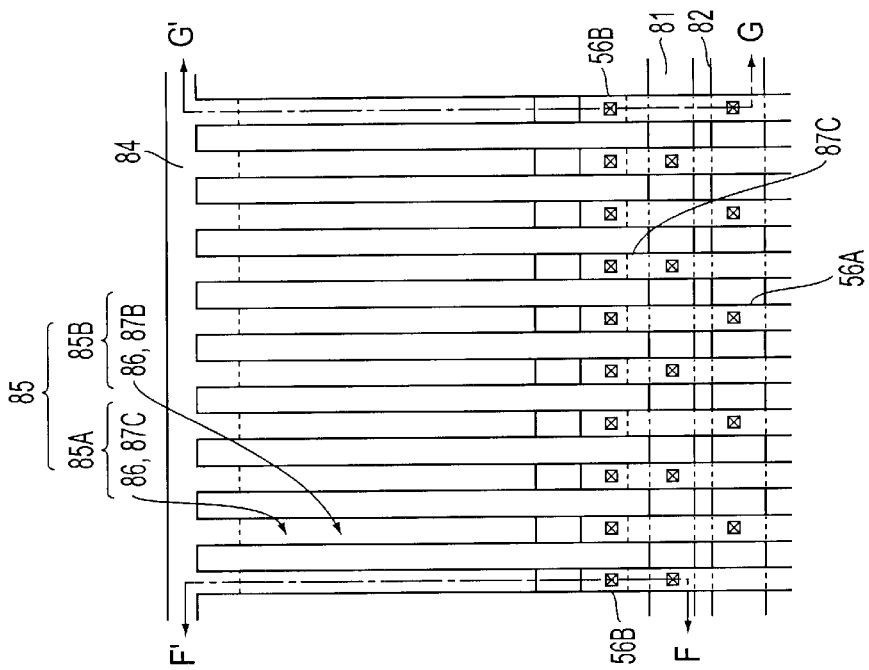
FIG. 9A is a top plan view showing the configuration of a capacitor added to a reset signal line of a liquid crystal device substrate according to another improvement example of the invention.
Figure 9B:
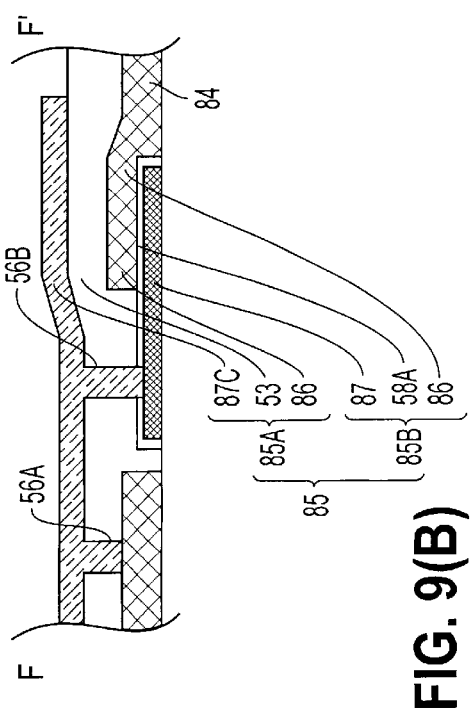
FIG. 9B is a sectional view at the line F–F' of FIG. 9A.
Figure 9C:
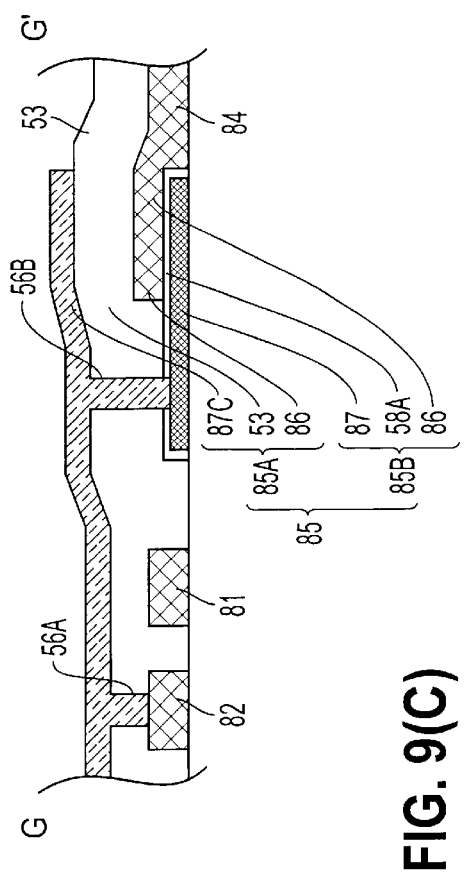
FIG. 9C is a sectional view at the line G–G' of FIG. 9B.

FIGS. 9A, 9B, and 9C are a top plan view illustrating the composition of the capacitor added to the reset signal lines of the liquid crystal device substrate related to another improved example, a sectional view at the line F–F' of FIG. 9A, and a sectional view at the line G–G' of FIG. 9B, respectively.

In composition example 2 set forth above, the electrode layer formed at the same time when the source region 521 and the drain region 522 of the TFT 50 are formed is employed as the second electrode 87B electrically connected to the reset signal lines 81 and 82, and the second electrode 87B and the reset signal lines 81 and 82 are electrically connected by the wiring layer 87C formed at the same time when the data line 30 is formed. Alternatively, however, the wiring layer 87C may be extended until it overlaps the first electrode 86 so that the wiring layer 87C may be also used as the second electrode opposed to the first electrode 86 via a dielectric film as illustrated in FIGS. 9A, 9B, and 9C.

According to the composition described above, the capacitor 85 will be provided with: a first capacitor 85A that employs, as the dielectric film thereof, the insulating film which is formed at the same time when the first interlayer insulating film 53 of the TFT 50 is formed and which is formed in the portion where the first electrode 86 composed of the polysilicon film formed at the same time when the scanning line 20 is formed overlaps the electrode layer 87C composed of the aluminum film formed at the same time when the data line 30 is formed; and a second capacitor 85B that employs, as the dielectric film thereof, the insulating film 58A which is formed at the same time when the gate insulating film 58 of the TFT 50 is formed and which is formed in the portion where the first electrode 86 formed at the same time when the scanning line 30 is formed overlaps the second electrode 57B composed of the polysilicon film formed at the same time when the source region 521 and the drain region 522 of the TFT 50 are formed.

The composition described above allows the capacitor 85 to be formed without adding to the number of manufacturing steps, by making use of the process for forming the TFT 50, the scanning line 20, and the data line 30. In addition, it is possible to provide, between the reset signal lines 81 and 82 and the potentiostatic line 84, the capacitor 85 with a larger capacitance resulting from the parallel electrical connection of the capacitor 85A having the first interlayer insulating film 53 as the dielectric film and the capacitor 85B having a large capacitance which employs, as the dielectric film thereof, the insulating film 58A formed at the same time when the gate insulating film 58, which is thinner than the first interlayer insulating film 53, is formed. This makes it possible to further increase the time constants of the reset signal conductors 81 and 82.

(Other Embodiment)

Figure 18:
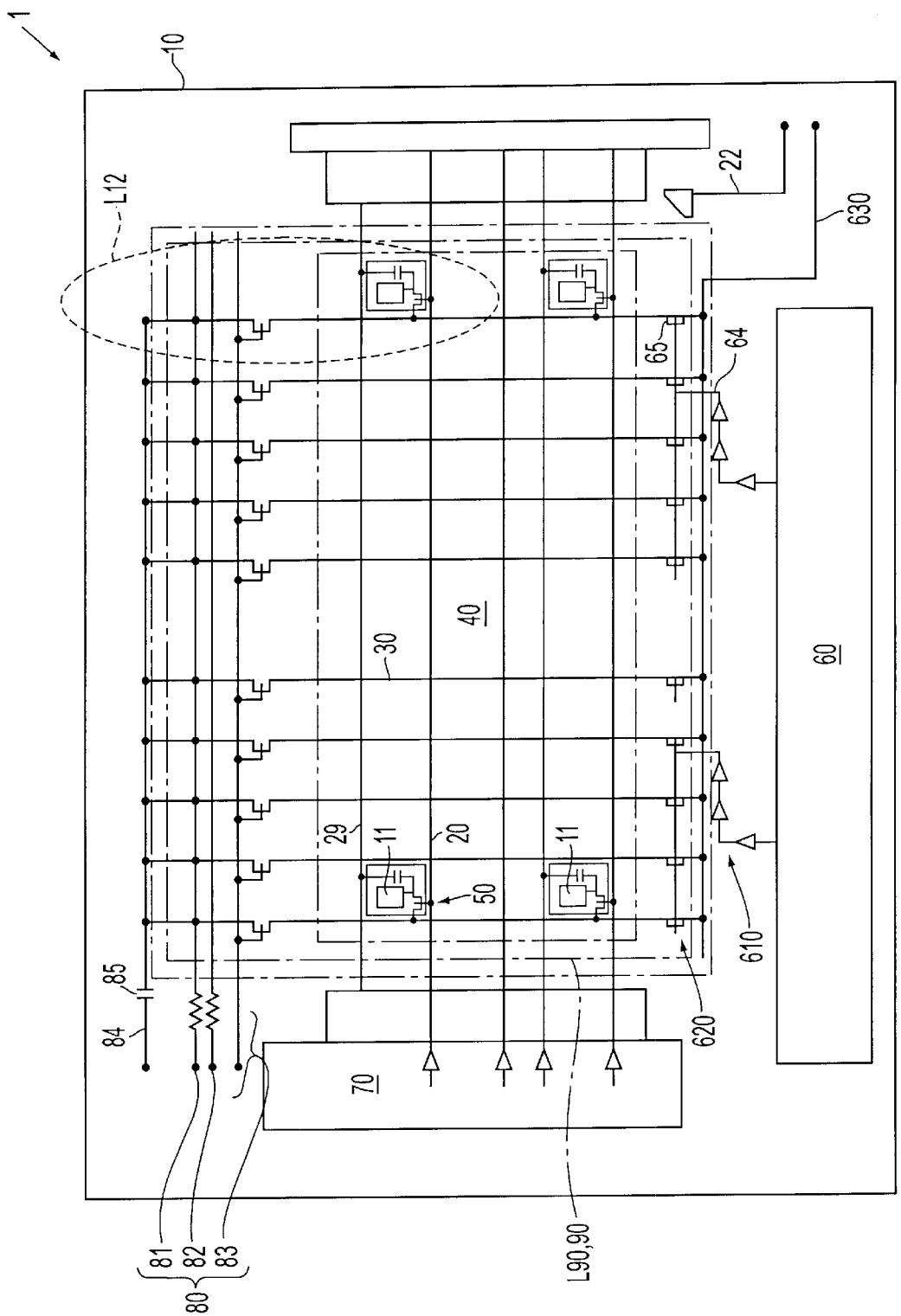
FIG. 18 is another block diagram showing a liquid crystal device substrate of a liquid crystal device in accordance with the present invention.

The formation of the active matrix substrate 1 is not limited to the composition examples 1, 2, and 3 set forth above as long as the capacitor 85 is composed by appropriately combining each of the conductor films and the insulating films when forming at least three conducting films (the scanning line 30, the data line 20, and the source region 521 and the drain region 522 of the TFT 50) and two insulating films (the interlayer insulating film 56 and the gate insulating film 58). In the foregoing composition examples, the capacitor is provided for the reset circuit formed for each data line; alternatively, however, a representative capacitor 85 may be provided in the reset circuit as illustrated in FIG. 18 instead of providing the capacitor for each data line in parallel.

Further, in the above embodiments, both the data-side driving circuit section 60 and the scanning-side driving circuit section 70 are provided on the liquid crystal device substrate 1. The present invention, however, can be applied also to a liquid crystal device in which the two driving circuit sections are separate from the liquid crystal device substrate 1. The present invention can be also applied to a composition where the driving circuit for outputting a control signal for controlling the operation of the reset potential supply ON/OFF switching circuit 83 in the reset driving circuit 80 is included in the liquid crystal device substrate 1 or to a composition where such a circuit is separate from the liquid crystal device substrate 1.

(Application Example of the Liquid Crystal Device)

An example wherein a transmissive liquid crystal device related to the foregoing embodiments is applied to electronic equipment will be described with reference to FIG. 10 through FIG. 14.

Figure 10:
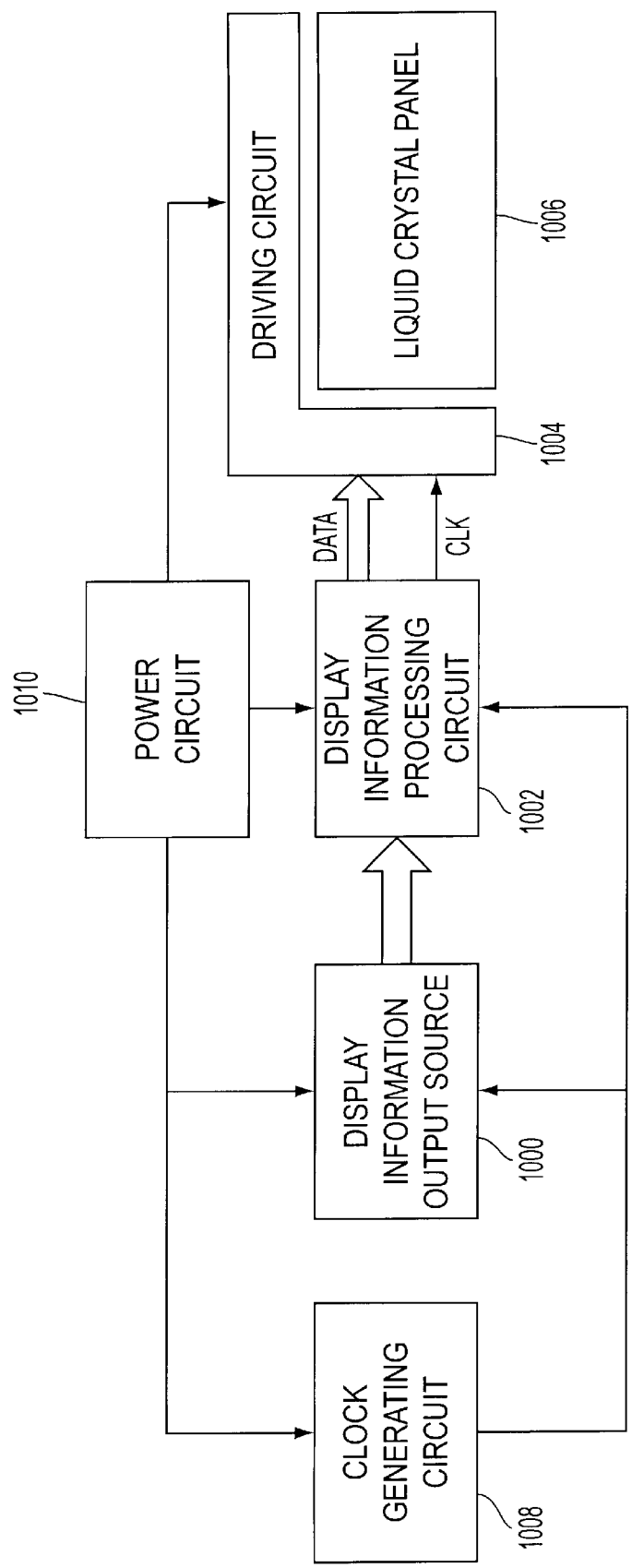
FIG. 10 is a block diagram showing an electronic equipment that employs a liquid crystal device to which the present invention has been applied.

The electronic equipment constituted by employing the aforesaid liquid crystal device includes a display information output source 1000, a display information processing circuit 1002, a display driving device 1004, a liquid crystal device 1006, a clock generating circuit 1008, and a power circuit 1010 as shown in the block diagram of FIG. 10. The display information output source 1000 is constituted primarily by memories such as a ROM and a RAM and a tuning circuit for tuning television signals and outputting them; it processes display information according to the clocks from the clock generating circuit 1008 and outputs the processed display information. The display information output circuit 1002 includes, for example, an amplifier/polarity inverting circuit, a phase developing circuit, a rotation circuit, a gamma correction circuit, or a clamping circuit to drive the liquid crystal device 1006. The power circuit 1010 supplies electric power to each of the foregoing circuits.

Figure 11:
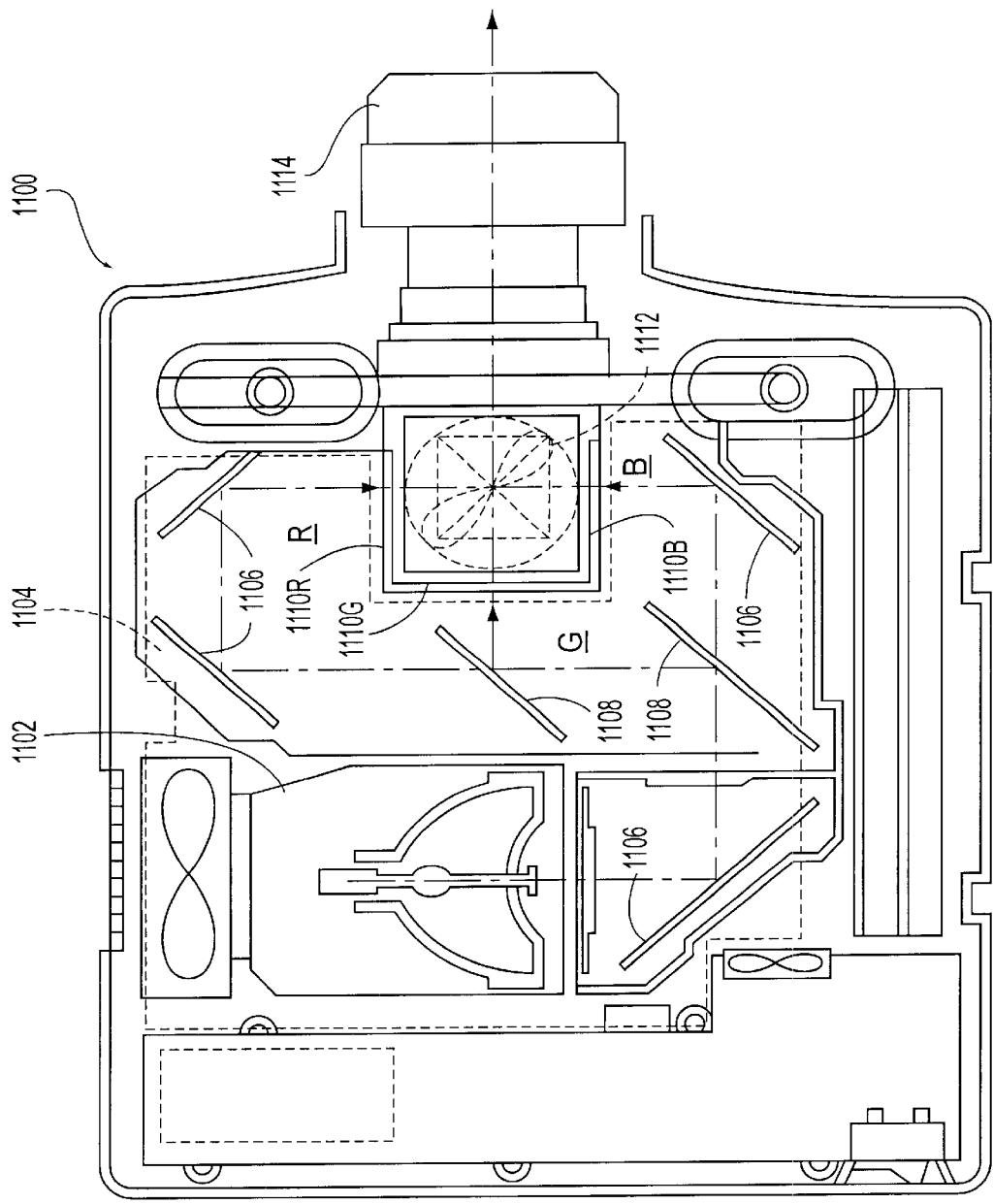
FIG. 11 is a schematic diagram showing an optical system of a projection display device that employs the liquid crystal device to which the present invention has been applied.
Figure 12:
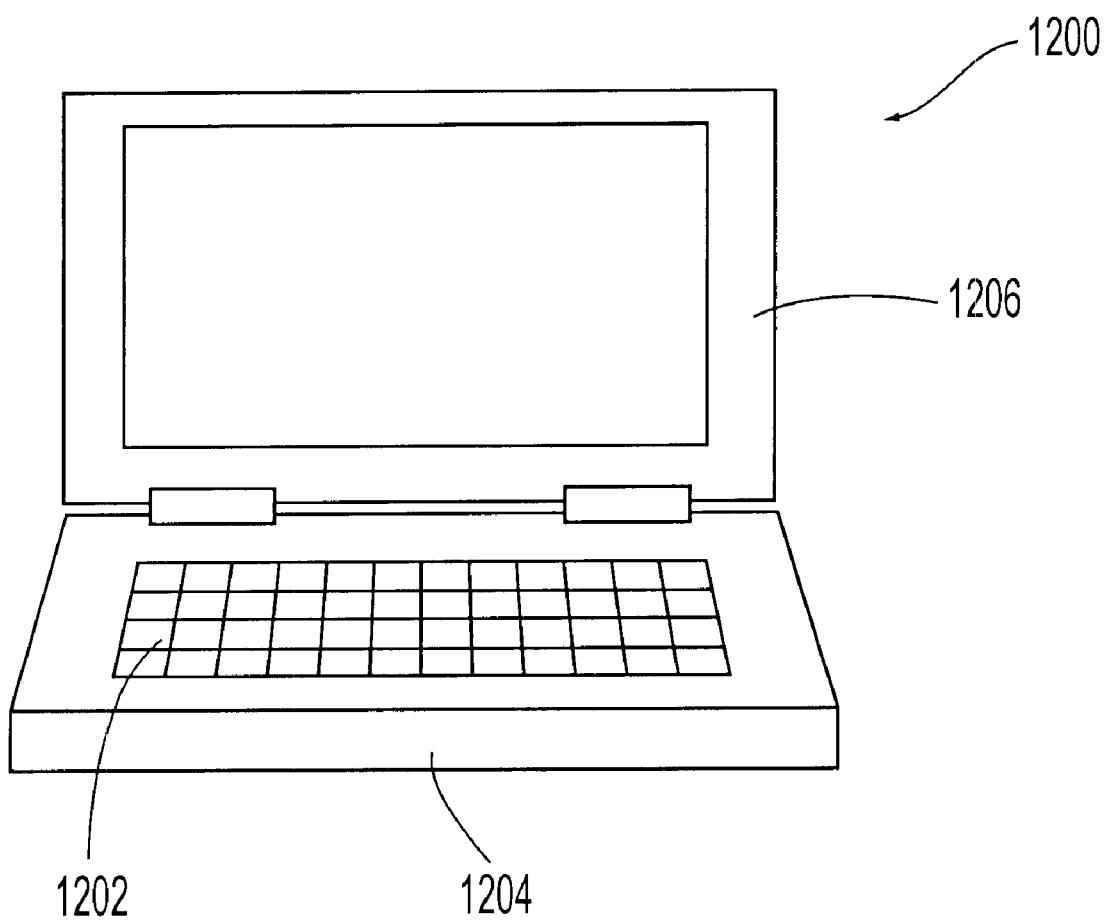
FIG. 12 is a schematic diagram of a personal computer that employs the liquid crystal device to which the present invention has been applied.
Figure 13:
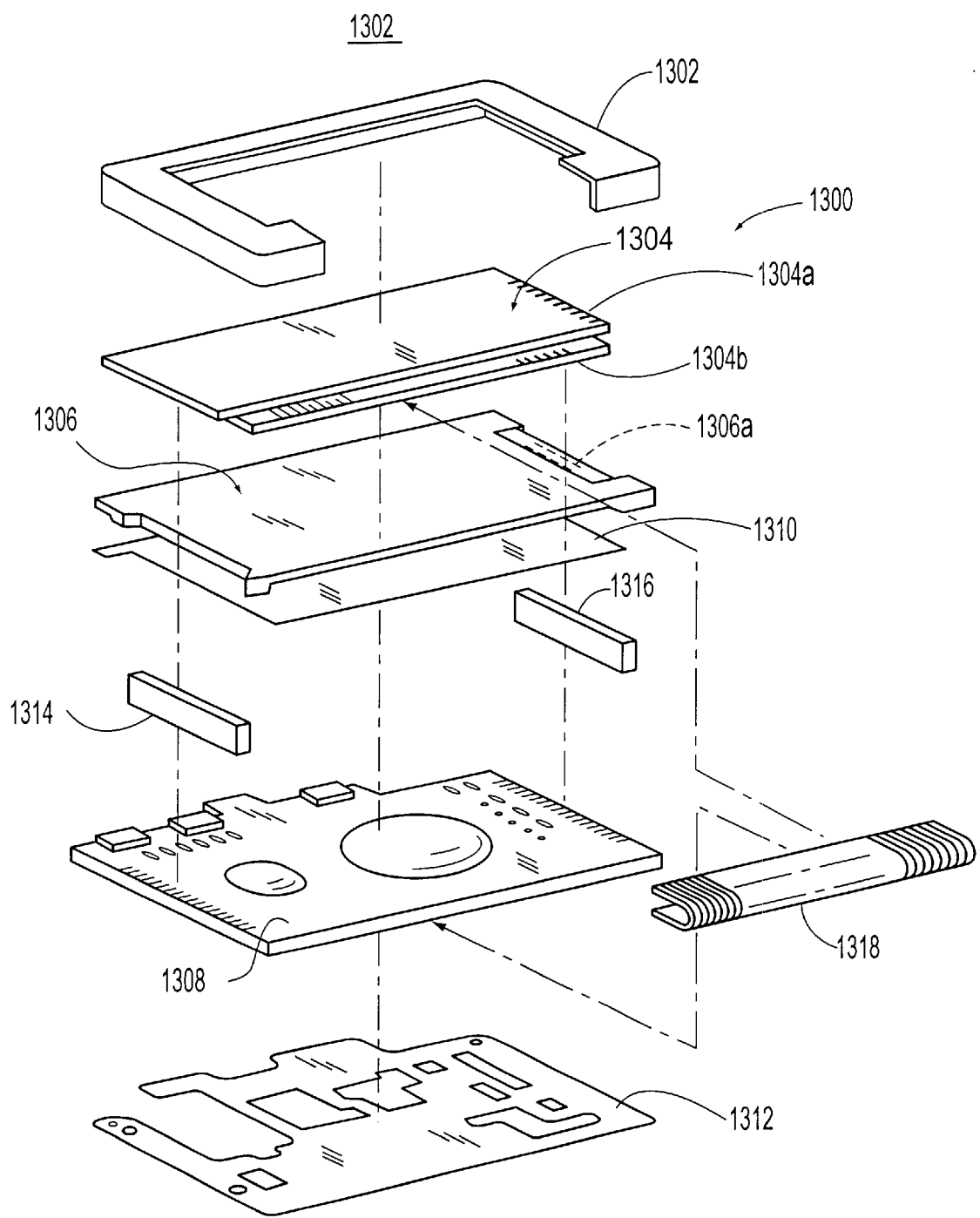
FIG. 13 is a schematic diagram of a pager that employs the liquid crystal device to which the present invention has been applied.

Electronic equipment having the aforesaid constitution includes a liquid crystal projector shown in FIG. 11, a multimedia personal computer (PC) shown in FIG. 12, an engineering workstation (EWS), a pager shown in FIG. 13 or a portable telephone, a word processor, a TV set, a viewfinder type or monitor viewing type video tape recorder, an electronic pocketbook, an electronic desktop calculator, a car navigation device, a POS terminal, and a device provided with a touch panel.

The projection display device shown in FIG. 11 is a projection type projector employing the liquid crystal device as a light valve; it uses, for example, a 3-piece prism type optical system. In a liquid crystal projector 1100 shown in FIG. 11, the projection light emitted from a lamp unit 1102, which is a white light source, is separated into three primary colors, namely, R, G, and B, through a plurality of mirrors 1106 and two dichroic mirrors 1108 (light separating means) in a light guide 1104 and the three color light beams are guided to three liquid crystal devices 1110R, 1110G, and 1110B that display the images of the respective colors. The light beams that have been modulated by the respective liquid crystal devices 1110R, 1110G, and 1110B are incident upon a dichroic prism 1112 (light synthesizing means) from three directions. The light beams of red R and blue B are bent by 90 degrees through the dichroic prism 1112, whereas the light beam of green G goes straight therethrough, so that the images of the respective colors are synthesized thereby to project a color image on a screen or the like through a projection lens 1114.

A personal computer 1200 shown in FIG. 12 has a main unit 1204 equipped with a keyboard 1202 and a liquid crystal device 1206 (liquid crystal screen).

A pager 1300 shown in FIG. 13 has a liquid crystal display substrate 1304, a light guide 1306 equipped with a backlight 1306*a*, a circuit substrate 1308, first and second shielding plates 1310 and 1312, two elastic conductors 1314 and 1316, and a film carrier tape 1318 in a metal frame 1302. The two elastic conductors 1314 and 1316 and the film carrier tape 1318 provide the connection between the liquid crystal display substrate 1304 and the circuit substrate.

The liquid crystal display substrate 1304 has liquid crystal sealed between two transparent substrates 1304*a* and 1304*b*; it constitutes at least a dot-matrix type liquid crystal device. On one of the transparent substrates, the driving circuit 1004 shown in FIG. 14 may be formed, or the display information processing circuit 1002 may also be formed in addition to the foregoing driving circuit. The circuits not mounted on the liquid crystal display substrate 1304 are provided as the external circuits of the liquid crystal display substrate 1304; or they may be mounted on the circuit substrate 1308 in the case of the example shown in FIG. 13.

Figure 14:
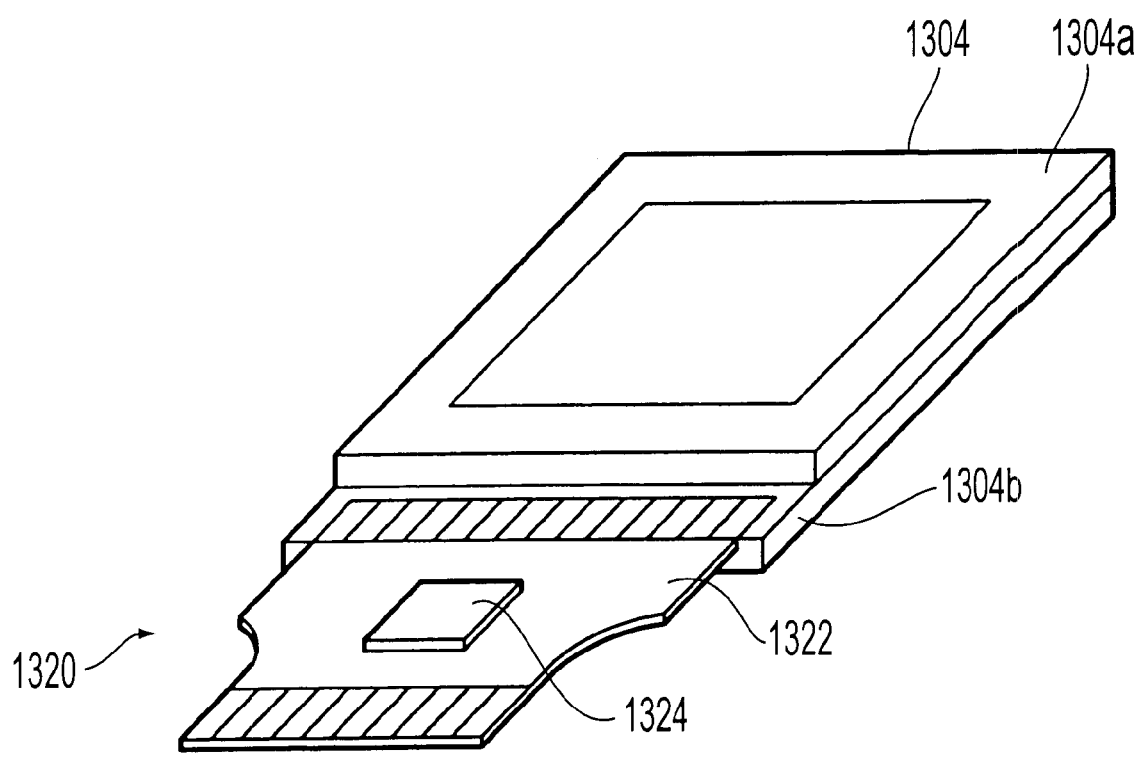
FIG. 14 is a schematic diagram of a liquid crystal display substrate employed for the pager of FIG. 13.
Figure 15:
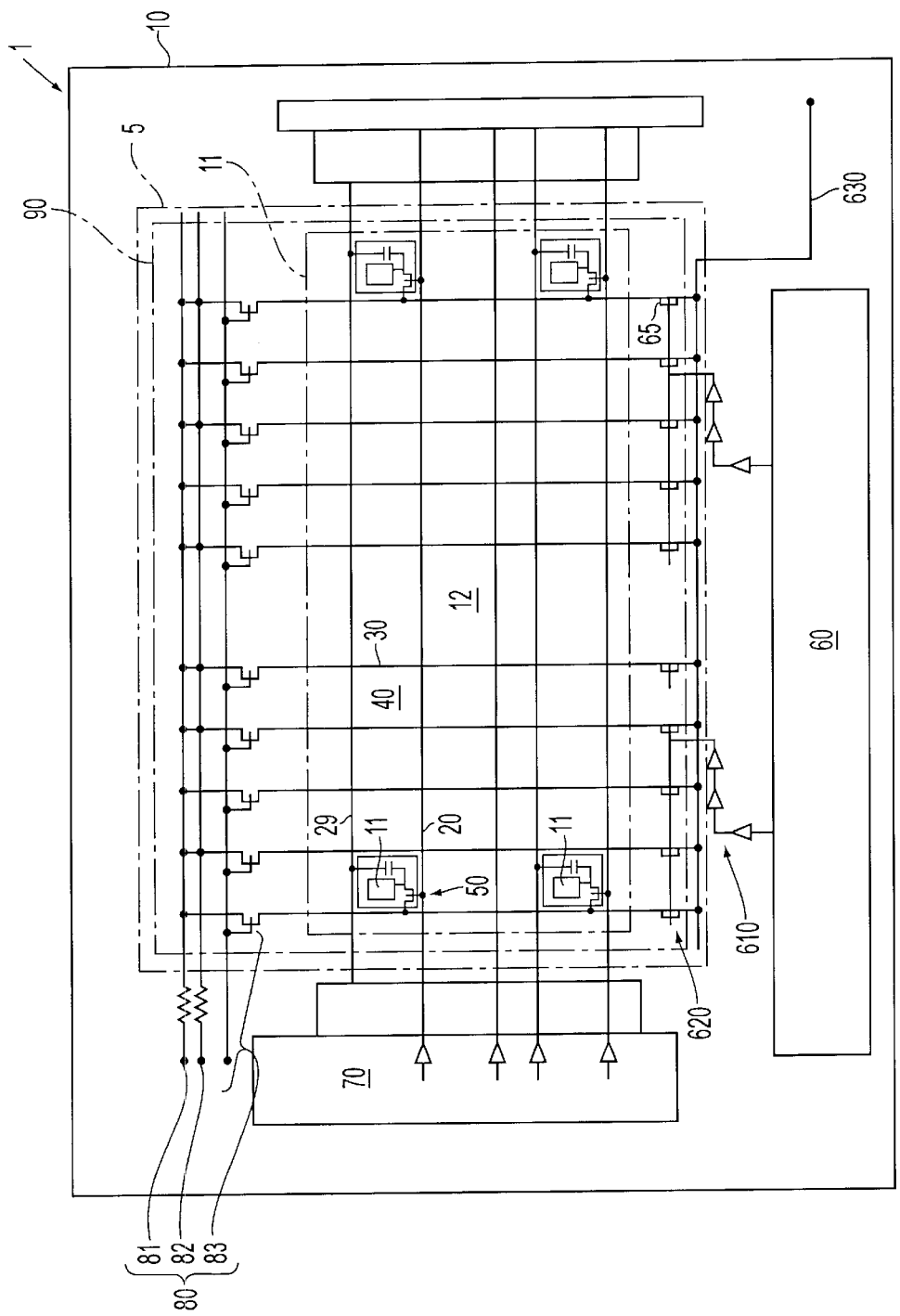
FIG. 15 is a block diagram showing a liquid crystal device substrate of a conventional liquid crystal device.

The pager, the constitution of which is shown in FIG. 13, requires a circuit substrate 1308 in addition to the liquid crystal display substrate 1304. When a liquid crystal device is used as a part for electronic equipment and when a display driving circuit is mounted on a transparent substrate, the minimum unit of the liquid crystal display device is the liquid crystal display substrate 1304. As an alternative, the liquid crystal display substrate 1304 may be fixed to the metal frame 1302 serving as an enclosure and so that it is used as the liquid crystal display device constituting a part of the electronic equipment. Further alternatively, as shown in FIG. 14, a TCP (Tape Carrier Package) 1320, in which an IC chip 1324 is mounted on a polyimide tape 1322 with a metal conductive film formed thereon, may be connected to one of the two transparent substrates 1304*a* and 1304*b* constituting the liquid crystal display substrate 1304 so that it may be used as the liquid crystal display device serving as a part of electronic connection.

The invention is not limited to the embodiments described above. It is apparent that various modified modes can be formed within the scope of the gist of the invention wherein a sealing layer is formed in the area where a wiring layer is formed. For instance, the application of the present invention is not limited to the drive of various liquid crystal devices described above; it is also applicable to a reflection type liquid crystal device, or other electro-optical devices e.g. electroluminescence or plasma display devices.

Thus, in the liquid crystal device in accordance with the present invention, the capacitor for increasing the time constants of the reset signal lines is provided on the first substrate. Hence, an electro-optical device such as the liquid crystal device in accordance with the invention makes it possible to set the time constants of the reset signal lines at sufficiently larger values than those of the time constants of the data lines, so that even if all the switching elements of the reset driving circuit are brought into conduction at a stretch with the reset signal lines when the reset potentials are applied to the data lines, the reset signals can be accurately written, enabling highly precise and good image display to be accomplished. Therefore, a lateral cross talk or other problems caused by the circulating of signals do not take place and improved quality of display can be achieved even in the case of an electro-optical device such as a type of liquid crystal device or the like in which the reset potentials are applied to the respective data lines before the image signals are supplied to the data lines.

Moreover, the capacitor for increasing the time constants of the reset signal lines, for example, is formed in the area which used to be a dead space and in which the sealing layer is formed, so that even when a capacitor with a larger capacitance is constituted, it is not required to increase the size of the liquid crystal device substrate or to reduce the size of the area including the pixel section where liquid crystal is sealed in.

There is another advantage that the capacitor can be formed without adding to the number of manufacturing steps if the first electrode and the second electrode constituting the capacitor are respectively formed by using the electrode layers, which are formed at the same time when the scanning lines, the data lines, or the switching elements of the pixel section are formed.

Industrial Applicability

An electro-optical device such as a liquid crystal device employing a liquid crystal device substrate in accordance with the present invention is applicable as a display device provided with a TFT or other driving elements and it is also applicable to a projection display device. Further, the electronic equipment in accordance with the invention is constituted by using the display device described above and it is usable as the electronic equipment or the like capable of providing high quality image display.

What is claimed is:

1. A liquid crystal device comprising:

a first substrate and a second substrate with liquid crystal sealed therebetween;

a pixel section, which is mounted on said first substrate, and is composed of a plurality of data lines to which image signals that have periodically inverted polarities are supplied, a plurality of scanning lines which cross said plurality of data lines and to which scanning signals are supplied, a first switching element connected to said respective data lines and scanning-lines, and a pixel electrode connected to said first switching element; and a reset driving circuit, which is mounted on said first substrate, is provided with a second switching element for supplying reset signals, which have been supplied to a reset signal line, to said data lines prior to the supply of image signals that have inverted polarities in an area around said pixel section, and a capacitor connected to said reset signal line that overlaps a sealing layer formed in an area outside of said pixel section, said first and second substrates being bonded to each other by the sealing layer;

said capacitor being disposed in an area where said sealing layer is formed and having first and second electrodes, said first electrode being supplied with a predetermined potential and said second electrode being electrically connected to said reset signal line and being disposed opposite to said first electrode with an insulating film disposed therebetween.

2. The liquid crystal device according to claim 1, further comprising:

said reset signal line being composed of a plurality of wiring layers arranged in parallel and said second electrode being connected to a predetermined wiring layer among said plurality of wiring layers via a contact hole.

3. The liquid crystal device according to claim 1, further comprising:
said first electrode being composed of a plurality of electrode layers extended from a potentiostatic line toward said reset signal line, and said second electrode being composed of a plurality of electrode layers extended from said reset signal line toward said potentiostatic line.

4. The liquid crystal device according to claim 1, wherein:
said first switching element is a thin film transistor, and said first electrode and said second electrode are respectively constituted by electrode layers having various interlayers formed at a same time when one of said scanning lines, said data lines, and a source-drain region of said thin film transistor is formed.

5. The liquid crystal device according to claim 4, wherein:
said first switching means is a thin film transistor, one of said first and second electrodes is composed of an electrode layer formed at a same time when said scanning lines are formed, while another one of said first and second electrodes is composed of an electrode layer formed at a same time when said data lines are formed, and
said insulating film is formed at a same time when an interlayer insulating film of said thin film transistor is formed.

6. The liquid crystal device according to claim 4, further comprising:
one of said first and second electrodes being composed of an electrode layer formed at a same time when said scanning lines are formed, while another one of said first and second electrodes is composed of an electrode layer formed at a same tie when a source-drain region of said thin film transistor is formed, and
said insulating film is a dielectric film formed at a same time when a gate insulating film of said thin film transistor is formed.

7. The liquid crystal device according to claim 4, further comprising:
one of said first and second electrodes being composed of an electrode layer formed at a same time when said scanning lines are formed, while another one of said first and second electrodes is composed of two electrode layers comprised of an electrode layer formed at a same time when said data lines are formed and an electrode layer formed at a same time when a source-drain region of said thin film transistor is formed, and
said capacitor includes a first capacitor which employs, as a dielectric film thereof, an insulating film formed at a same time when an interlayer insulating film of said thin film transistor is formed in a portion where an electrode layer formed at a same time when said scanning lines are formed overlaps an electrode layer formed at a same time when said data lines are formed, and a second capacitor which employs, as a dielectric film thereof, an insulating film formed at a same time when a gate insulating film of said thin film transistor is formed in a portion where an electrode layer is formed at a same time when said scanning lines are formed overlaps an electrode layer formed at a same time when a source-drain region of said thin film transistor is formed.

8. The liquid crystal device according to claim 1, further comprising:
a data-side driving circuit that supplies said image signals to said data lines and a scanning-side driving circuit that supplies scanning signals to said scanning lines, at least one of the data-side driving circuit and the scanning-side driving circuit being mounted on one of said first and second substrates.

9. The liquid crystal device according to claim 1, said capacitor being comprised of a plurality of capacitors connected to said respective data lines, and said plurality of capacitors being formed in an area of said seal layer.

10. The liquid crystal device according to claim 1, further comprising a value of said capacitor being larger than one-half of a total capacitance of said data lines.

11. An electro-optical device comprising:
a plurality of data lines to which image signals that have periodically inverted polarities are supplied;
a plurality of scanning lines to which scanning signals are supplied;
a first switching element connected to said respective data lines and said scanning lines; and
a pixel electrode connected to said first switching element;
said electro-optical device further comprising a reset driving circuit which includes a second switching element that supplies reset signals, which have been supplied to a reset signal line, to said data lines prior to a period in which image signals that have inverted polarities are supplied to said data lines, and a capacitor connected to said reset signal line that overlaps a sealing layer formed in an area outside of said pixel section.

12. The electro-optical device according to claim 11, further comprising:
said capacitor being composed of a first electrode to which a predetermined potential is supplied and a second electrode electrically connected to said reset signal line.

13. A projection display device employing an electro-optical device described in claim 11, further comprising:
a light source section; and
a projecting means for projecting a light beam which has been emitted from said light source section and modulated by said electro-optical device onto a projection surface.

14. A liquid crystal device comprising:
a first substrate and a second substrate with liquid crystal sealed therebetween;
a pixel section, which is mounted on said first substrate, and is composed of a plurality of data lines to which image signals are supplied, a plurality of scanning lines which cross said plurality of data lines and to which scanning signals are supplied, a first switching element connected to said respective data lines and scanning lines, and a pixel electrode connected to said first switching element; and
a reset driving circuit, which is mounted on said first substrate, is provided with a second switching element for supplying reset signals, which have been supplied to a reset signal line, to said plurality of data lines prior to the supply of image signals in an area around said pixel section, and a plurality of capacitors connected to said reset signal line that overlaps a sealing layer formed in an area outside of said pixel section, said first and second substrates being bonded to each other by the sealing layer;

said plurality of capacitors being disposed in an area where said sealing layer is formed and having first and second electrodes, said first electrode being supplied with a predetermined potential and said second electrode being electrically connected to said reset signal line and being disposed opposite to said first electrode with an insulating film disposed therebetween.

15. An electro-optical device comprising:

a plurality of data lines to which image signals are supplied;

a plurality of scanning lines to which scanning signals are supplied;

a first switching element connected to said respective data lines and said scanning lines; and a pixel electrode connected to said first switching element;

said electro-optical device further comprising a reset driving circuit which includes a plurality of second switching elements that supplies reset signals, which have been supplied to a reset signal line, to said data lines prior to a period in which image signals are supplied to said data lines, a plurality of capacitors connected to said reset signal line that overlaps a sealing layer formed in an area outside of said pixel section, and the sealing layer being used for sealing an electro-optical material that is overlapped with an area having said plurality of capacitors.

16. A liquid crystal device comprising:

a first substrate and a second substrate with liquid crystal sealed therebetween;

a pixel section, which is mounted on said first substrate, and is composed of a plurality of data lines to which image signals that have periodically inverted polarities are supplied, a plurality of scanning lines which cross said plurality of data lines and to which scanning signals are supplied, a first switching element connected to said respective data lines and scanning-lines, and a pixel electrode connected to said first switching element; and a reset driving circuit, which is mounted on said first substrate, is provided with a second switching element for supplying reset signals, which have been supplied to a reset signal line, to said data lines prior to the supply for image signals that have inverted polarities in an area around said pixel section, and a capacitor connected to said reset signal line, said first and second substrates being bonded to each other by a sealing layer formed in an area outside said pixel section;

said capacitor being disposed in an area where said sealing layer is formed and having first and second electrodes, said first electrode being supplied with a predetermined potential and said second electrode being electrically connected to said reset signal line and being disposed opposite to s aid first electrode with an insulating film dispose d therebetween, said capacitor being disposed between one input terminal and the second switching element.

17. A liquid crystal device comprising:

a first substrate and a second substrate with liquid crystal sealed therebetween;

a pixel section, which is mounted on said first substrate, and is composed of a plurality of data lines to which image signals that have periodically inverted polarities are supplied, a plurality of scanning lines which cross said plurality of data lines and to which scanning signals are supplied, a first switching element connected to said respective data lines and scanning-lines, and a pixel electrode connected to said first switching element; and a reset driving circuit, which is mounted on said first substrate, is provided with a second switching element for supplying reset signals, which have been supplied to a reset signal line, to said data lines prior to the supply for image signals that have inverted polarities in an area around said pixel section, and a capacitor connected to said reset signal line, said first and second substrates being bonded to each other by a sealing layer formed in an area outside said pixel section;

said capacitor being disposed in an area where said sealing layer is formed and having first and second electrodes, said first electrode being supplied with a predetermined potential and said second electrode being electrically connected to said reset signal line and being disposed opposite to said first electrode with an insulating film disposed therebetween, said capacitor and a capacitor connected to the pixel electrode being formed at the same time.

\* \* \* \* \*